(12) United States Patent
Robertson et al.

(10) Patent No.: US 7,663,620 B2
(45) Date of Patent: Feb. 16, 2010

(54) ACCESSING 2D GRAPHIC CONTENT USING AXONOMETRIC LAYER VIEWS

(75) Inventors: George G Robertson, Seattle, WA (US);
Daniel C Robbins, Seattle, WA (US);
Desney S Tan, Kirkland, WA (US);
Kenneth P Hinckley, Redmond, WA (US); Maneesh Agrawala, Seattle, WA (US); Mary P Czerwinski, Woodinville, WA (US); Patrick Markus Baudisch, Seattle, WA (US); Gonzalo A Ramos, Toronto (CA)

(73) Assignee: Microsoft Corporation, Redmond, WA (US)

( * ) Notice: Subject to any disclaimer, the term of this patent is extended or adjusted under 35 U.S.C. 154(b) by 174 days.

(21) Appl. No.: 11/294,118

(22) Filed: Dec. 5, 2005

(65) Prior Publication Data

US 2007/0126732 A1  Jun. 7, 2007

(51) Int. Cl.
*G06T 15/00* (2006.01)
*G09G 5/00* (2006.01)
(52) U.S. Cl. .................. 345/419; 345/629; 715/788
(58) Field of Classification Search .................. None
See application file for complete search history.

(56) References Cited

U.S. PATENT DOCUMENTS 6,590,593 B1 *  7/2003  Robertson et al. ........... 715/782
6,590,594 B2 *  7/2003  Bates et al. .................. 715/784
2003/0151604 A1 *  8/2003  Kaufman et al. ............ 345/419
2003/0236836 A1 *  12/2003  Borthwick .................. 709/204
2007/0022389 A1 *  1/2007  Ording et al. ............... 715/790

OTHER PUBLICATIONS

Ben Willmore, "Adobe Photoshop CS2 Studio Techniques", Pub Aug. 17, 2005, Safari Online Books, Section titled "Layers Primer > Meeting the Layers" (HTML Version).*
Wilmot Li, Maneesh Agrawala, David Salesin, Interactive image-based exploded view diagrams, Proceedings of the 2004 conference on Graphics interface, p. 203-212, May 17-19, 2004, London, Ontario, Canada.*
Baudisch, P., and C. Gutwin, "Multiblending: Displaying Overlapping Windows Simultaneously Without the Drawbacks of Alpha Blending," *Proceedings of Conference on Human Factors in Computing Systems*, Vienna, Austria, Apr. 24-29, 2004, pp. 367-374.
Baudisch, P., et al., "Drag-and-Pop and Drag-and-Pick: Techniques for Accessing Remote Screen Content on Touch- and Pen-Operated Systems," *Proceedings of the Ninth International Conference on Human-Computer Interaction*, Zurich, Switzerland, Sep. 1-5, 2003, pp. 57-64.

(Continued)

*Primary Examiner*—Ulka Chauhan
*Assistant Examiner*—Daniel F Hajnik
(74) *Attorney, Agent, or Firm*—Lee & Hayes, PLLC

(57) ABSTRACT

Providing axonometric views of layers containing objects while preserving the visual attributes of the objects is disclosed. A group of objects, e.g., overlapping objects, is determined. Layer dimensions are calculated such that each object in the group is encompassed by a layer. Objects are placed in the layers and the layers are displayed in axonometric views. Visual cues to indicate selected layers are provided. Controls to adjust the depth of the layers and to enable moving objects in the selected layer are also provided.

14 Claims, 19 Drawing Sheets

OTHER PUBLICATIONS

Beaudouin-Lafon, M., "Novel Interaction Techniques for Overlapping Windows," *Proceedings of the Annual ACM Symposium on User Interface* 3(2):153-154, Orlando, Fla., Nov. 11-14, 2001.

Bier, E.A., et al., "Toolglass and Magic Lenses: The See-Through Interface," *Proceedings of Computer Graphics Annual Conference Series*, Association for Computing Machinery, 1993, pp. 73-80, <http://www2.parc.com/istl/projects/MagicLenses/93Siggraph.html> [retrieved Sep. 28, 2005].

Card, S.K., et al., "The Design Space of Input Devices," *CHI '90 Proceedings*, Apr. 1990, pp. 117-124.

Carpendale, M.S.T., et al., "Extending Distortion Viewing From 2D to 3D," *IEEE Computer Graphics and Applications* 17(4):42-51, 1997.

Dragicevic, P., "Combining Crossing-Based and Paper-Based Interaction Paradigms for Dragging and Dropping Between Overlapping Windows," *Proceedings of the 17th Annual ACM Symposium on User Interface Software and Technology* 6(2):193-196, Santa Fe, N. Mex., Oct. 24-27, 2004.

"Exposé: Find the Window You Need. Now." © 2005 Apple Computer, Inc., <http://www.apple.com/macosx/features/expose/> [retrieved Sep. 28, 2005].

Inselberg, A., and B. Dimsdale, "Parallel Coordinates: A Tool for Visualizing Multi-Dimensional Geometry," *Proceedings of IEEE Symposium on Information Visualization*, San Francisco, Calif., 1990, pp. 361-378.

Ishak, E.W., and S.K. Feiner, "Interacting With Hidden Content Using Content-Aware Free-Space Transparency," *Proceedings of the 17th Annual ACM Symposium on User Interface Software and Technology* 6(2):189-192, Santa Fe, N. Mex., Oct. 24-27, 2004.

Krikke, J., "Axonometry: A Matter of Perspective," *IEEE Computer Graphics and Applications* 20(4):7-11, 2000.

Kurtenbach, G., and W. Buxton, "The Limits of Expert Performance Using Hierarchic Marking Menus," *Proceedings of the Conference on Human Factors in Computing Systems*, Amsterdam, The Netherlands, Apr. 24-29, 1993, pp. 482-487.

McGuffin, M.J., et al., "Using Deformations for Browsing Volumeric Data," *Proceedings of the 14th IEEE Visualization Conference*, Seattle, Wash., Oct. 19-24, 2003, pp. 401-408.

Ramos, G., and R. Balakrishnan, "Fluid Interaction Techniques for the Control and Annotation of Digital Video," *Proceedings of the ACM Symposium on User Interface Software and Technology* 5(2):105-110/222-225, Vancouver, Canada, 2003.

Robertson, G., et al., "The Large-Display User Experience," *Special Issue of IEEE Computer Graphics and Applications* 25(4): Jul. 2-9, 2005.

Shen, C., et al., "CoR2Ds: Context-Rooted Rotatable Draggables for Tabletop Interaction," *Proceedings of Conference on Human Factors in Computing Systems*, Portland, Ore., Apr. 2-7, 2005, pp. 1781-1784.

Sonnet, H., et al., "Integrating Expanding Annotations With a 3D Explosion Probe," *Proceedings of the Advanced Visual Interfaces International Working Conference*, Gallipoli, Italy, May 25-28, 2004, pp. 63-70.

Stange, K., "Dr. Miro: An Empirical Aesthetics Research Program," © 2000, <http://kenstange.com/drmiro/> [retrieved Sep. 30, 2005].

Ware, C., and R. Bobrow, "Motion to Support Rapid Interactive Queries on Node-Link Diagrams," *ACM Transactions on Applied Perceptions* 1(1): Jul. 3-18, 2004.

* cited by examiner

ACCESSING 2D GRAPHIC CONTENT USING AXONOMETRIC LAYER VIEWS

BACKGROUND

Computing devices enabled with appropriate software programs can be used to create images that are viewed on a display or rendered in another medium such as print or video. Software programs that enable creating images on computing devices are generically referred to herein as "graphic applications." Graphic applications may be primarily used to create and manipulate images or may provide image creation and manipulation functions in addition to functions not directly related to image creation. An important subset of graphic applications are two dimensional, i.e., 2D, graphic applications which are used for drawing, painting, image editing, photo editing, video editing, etc.

A common problem in 2D graphic applications is accessing and manipulating occluded content. For example, during the construction of a 2D drawing, a shape may completely overlap another shape causing the overlapped shape to become occluded. Because the underlying shape is no longer visible, it may be difficult or impossible to select the underlying shape. Even if part of the underlying shape is visible, the exposed part may be too small to be easily accessible. This problem can occur whether the visual objects involved are discretely defined shapes with well-defined borders or areas with blurred edges such as in a photographic image.

It is convenient to think of a group of overlapping visual objects as a stack of infinitely thin paper cutouts. In this model, there is no true depth dimension, only dimensions along the X-axis and the Y axis. There is a depth order that is referred to as the "Z order" because it is defined along the Z-axis. The infinitely thin paper cutouts, i.e., objects, are stacked in Z order with each object having a Z-index indicating the object's location in the stack. Depending on the graphic system used, the ordering may be front to back, i.e., zero index in front, or back to front, i.e., zero index in back. For the problem of accessing overlapping objects, the relative order of the objects is more of a concern than the absolute ordering. In a stack of overlapping objects, an overlapping object is the "upper" object and the overlapped and perhaps occluded object is the "lower" object.

Barring other affordances, selecting and manipulating occluded objects requires an upper object to be moved in order to access a lower object. Unless there is an easy way to retain the original location of the upper object, it may be difficult to return the upper object to the upper object's original location. To avoid changing the location of objects, there are controls that enable successively cycling through a stack of objects until an object is "lifted" or "sunk" to the desired Z-index. Another approach that preserves locations is using a scene index. A scene index is an ordered linear list of thumbnails, i.e., small pictures, of the objects in an image. Moving an object's thumbnail up or down in the scene index causes the object to move up or down, i.e., changes the Z-index of the object.

Moving occluding objects and cycling objects are viable solutions to the occluded content problem until the total number of objects in an image grows large. For example, given a dozen or so objects, moving occluding objects or cycling through objects often requires adjusting each object more than once. The more objects there are, the more likely it is that each object will need to be adjusted. Using a scene index is less troublesome in this respect, but has another limitation. The thumbnails in a scene index tend to reduce or eliminate identifying features of objects, e.g., shape, color, size, position. For example, if there are a half-dozen red circles of varying sizes and shades in an image, all six images may appear as similarly sized red circles in the scene index. In order to include every object in an image, a scene index can grow longer than the screen height requiring the user to scroll through the scene index.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and apparatus, including computer-readable medium, for providing axonometric views of layers containing objects, especially overlapping objects, while preserving the visual attributes of the objects, is disclosed. An object group, i.e., a group of overlapping objects, is determined. Dimensions of layers for the objects are calculated such that all of the shapes in the group are within the boundaries of a layer. Each object is placed in a layer. The layers are displayed in an axonometric view. Visual cues are provided to indicate selected layers. A control is provided to adjust the depth of the layers. Controls are provided to enable change in the location of an object in a selected layer.

The group of overlapping objects is determined by selecting the objects that overlap or are overlapped by a selected object. Each layer has the same dimensions. The layer dimensions are calculated by taking the union of the bounding rectangles of the objects in the group of overlapping objects. The dimensions of the layers change in response to the location of the objects in layers in the object group.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
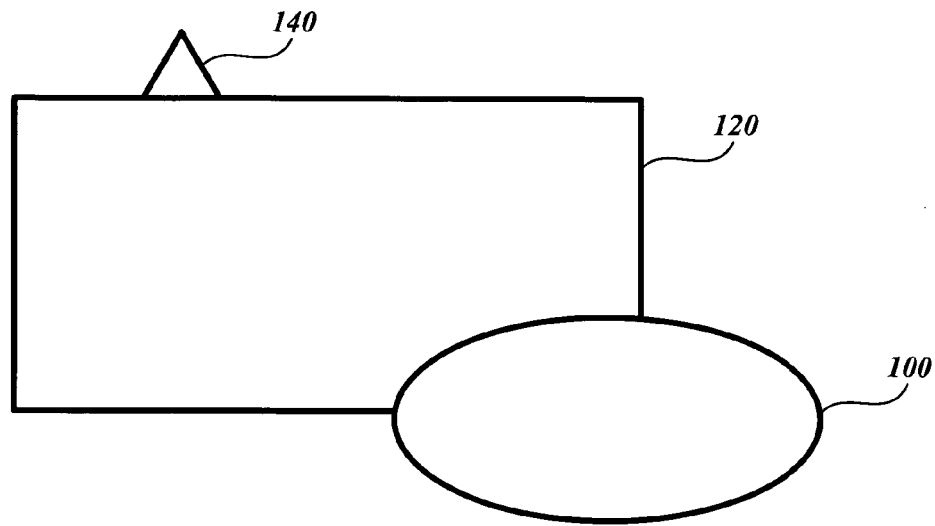
FIG. 1 is an illustration of three exemplary overlapping 2D objects, i.e., objects.

DETAILED DESCRIPTION 2D graphic applications, with support from a graphical user interface (GUI), enable users to create images composed of 2D visual elements, i.e., objects, and to view and manipulate the objects. To enable users to manipulate or otherwise interact with objects, a GUI displays a "cursor," i.e., a small, movable graphic symbol, e.g., an arrow, used to point to objects. Cursor movement is usually controlled by a pointing device such as a mouse, trackball, etc., but may also be controlled by a touchpad, touch screen, keyboard, keypad, etc. A pointing device contains a multidirectional detection device and/or one or more buttons or keys. Actuation of the pointing device directs the movement of the cursor on the display. To point to a displayed object, a pointing device, e.g., a mouse, is used to move the cursor over the object. Often, the appearance of the object changes to indicate that the cursor is positioned over the object.

A commonly applied appearance change is "highlighting." When an object is highlighted, the appearance of the object is altered in a way that calls attention to the object while keeping the visual element recognizable. Examples of highlighting include, but are not limited to, reversing the intensity of the colors of an object to create a "negative" image; changing the color and/or thickness of a border or background; overlaying an object with a transparent color rectangle or other shape; changing the hue, saturation, or value of the colors of an object, etc. Highlighting is often used to indicate that a particular object has "focus," i.e., is the target of an action. After a cursor is positioned over an object, i.e., the object has focus and is highlighted, the object can be selected by pressing and releasing a mouse button without moving the cursor. Such "clicking" of a mouse button causes actions to be initiated in the computing device, the display, or both. For example, clicking on an object presented in a diagram in the application may cause a change in an object's appearance.

The effect of changing the appearance of a clicked visual element is used to provide "soft" controls such as "soft" buttons. Soft buttons are objects that mimic physical buttons such as the buttons on a pointing device. In the following discussion, the term "button" refers to soft buttons and should not be confused with physical buttons, such as mouse buttons. The appearance of a button changes to reflect the state of the button. Button states include, but are not limited to, unpushed, pushed, and disabled. 2D graphic applications often use buttons and other soft controls to enable user interaction.

An object may also be moved in the display by "dragging" the object. Dragging is performed by pressing a mouse button or key and holding down the mouse button or key while moving the mouse, causing the cursor and the object the cursor is over to move. A variant of dragging, often referred to as "select dragging," may be used to select a plurality of objects in an area of the display. To begin select dragging, the cursor is placed over an empty area of the display outside of the plurality of objects to be selected. The mouse button is held down and the cursor is "dragged" diagonally across the area containing the plurality of objects. Preferably, a rectangle with a dashed line border is used to describe a rectangular region as the cursor is dragged. The cursor is dragged until the rectangle surrounds the plurality of objects. When the desired objects are surrounded by the rectangle, the mouse button is released selecting the surrounded objects.

In both clicking and dragging, the button or key is usually a part of the pointing device, e.g., a mouse button, but may be a part of another device, e.g., a key on a keyboard. Clicking and dragging objects often occurs inside windows and panes. A window is a bounded region of a display that is dedicated to presenting objects and/or providing a particular set of functions, i.e., actions. A pane is a bounded sub-region within a window that is usually dedicated to working with a subset of the objects and/or functions provided by the containing window. Windows and panes are normally rectangular but may be any two-dimensional shape.

While moving the focus, e.g., highlight, from one object to another, selecting objects, and invoking actions may be supported by a mouse having buttons, such activities may also be supported by keys on a keyboard. For example, pressing a tab key may cause the focus to move from one object to another and pressing return key may select an object that has focus. Thus, actions, described herein as invoked using a mouse with buttons, may also be invoked using a keyboard with keys.

The GUI features described above are often used in 2D graphic applications to create, view, and manipulate 2D images containing objects. Often, objects in a 2D image overlap and, at times, overlap such that objects are occluded or otherwise made inaccessible. An example of overlapping objects in a 2D image is shown in FIG. 1. In FIG. 1, oval 100 overlaps rectangle 120 which in turn overlaps triangle 140. Triangle 140 is not completely occluded but because only a small part of triangle 140 is visible, triangle 140 may be difficult to access, e.g., click on. It is desirable to make the object more accessible without changing visual attributes such as, but not limited to, shape, color, size, and position. In order to make an object more accessible, e.g., triangle 140, a tool may be provided by a GUI that places objects in layers and provides axonometric views of the layers. Objects presented in an axonometric view of a layer may be accessed "in place," i.e., directly and without relying on representations external to the image area. Preferably, a user creates an axonometric view of layers containing objects by clicking on an object in a group of objects, i.e., an object group, holding down a modifier key, and dragging a cursor diagonally away from the object group. It is also possible to use a special purpose mouse button, e.g., a right mouse button on a two button mouse, or other control, to provide a function similar to the function provided by a modifier key. Hence, the use of a modifier key in conjunction with clicking and dragging to create axonometric views of layers should be construed as exemplary and not limiting. An exemplary process for creating an axonometric view of layers containing objects is illustrated by FIGS. 1, 2, and 4 through 6.

In FIG. 1, if rectangle 120 is clicked while a modifier key, e.g., the Control (CTRL) key on a keyboard, is held down, a group of overlapping layers are created, one layer for each of the objects in the object group. It is also possible to select objects for an object group that do not overlap and to select objects using selection criteria and rules not involving overlapping. Selecting objects for an object group by selecting objects that overlap should be construed as exemplary and not limiting.

Figure 2:
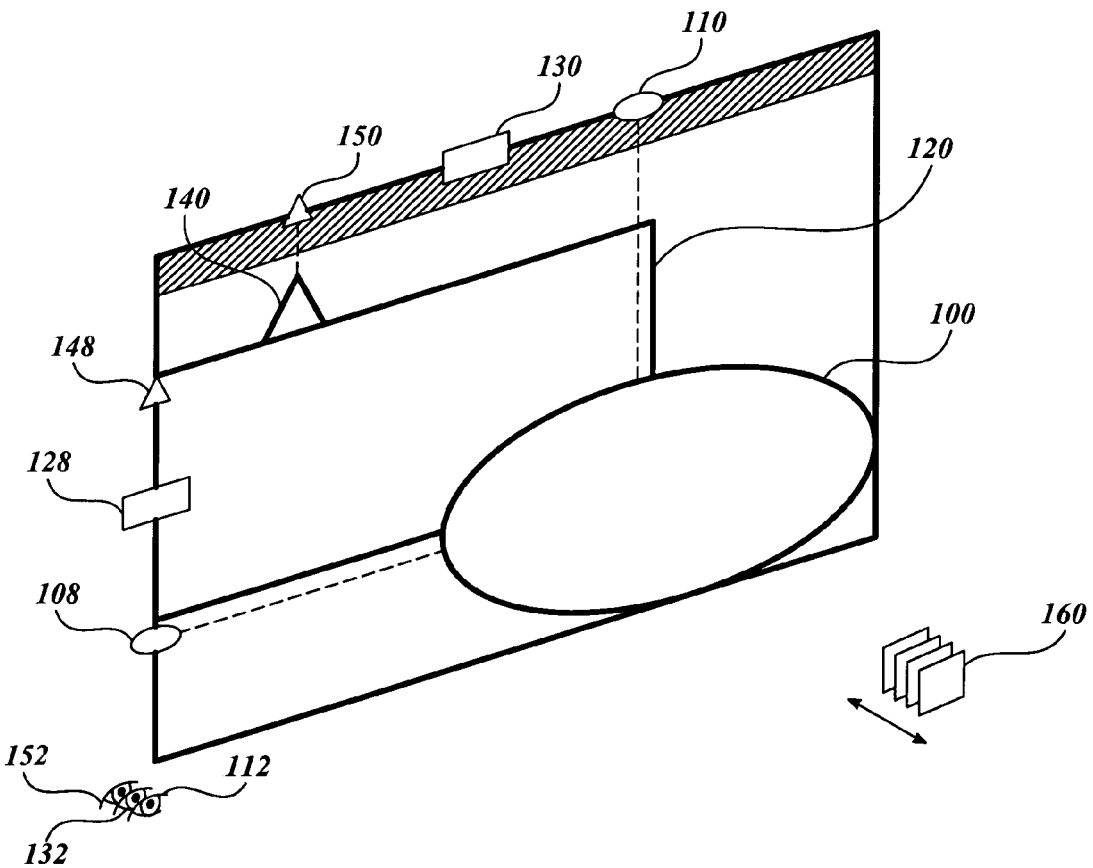
FIG. 2 is an illustration of the three exemplary overlapping objects shown in FIG. 1 presented in an exemplary axonometric view of unexpanded layers.

FIG. 2 illustrates the unexpanded, i.e., contracted, overlapping layers that are created for the objects in the object group shown in FIG. 1. Because the layers are contracted, the objects in the object group, i.e., the oval 100, the rectangle 120, and the triangle 140, appear to be in the same layer. Exemplary controls for adjusting the X and Y positions of the objects are provided. For each object, an X positioning handle, i.e., X-handle, and Y positioning handle, i.e., Y-handle are provided. Triangle 140 has X-handle 150 and Y-handle 148. Rectangle 120 has X-handle 130 and Y-handle 128. Oval 100 has X-handle 110 and Y-handle 108. Each layer also has a visibility icon. A visibility icon is a control used to set and indicate the visibility of a layer. Since the layers are contracted, the visibility icons 112, 132, and 152 are very close to each other. The cursor's image changes to an expansion adjustment cursor image, i.e., expansion cursor 160, to indicate that layer expansion and/or contraction is being performed. While the process is active, i.e., the modifier key is held down, moving the cursor diagonally away from the object group expands the layers and moving the cursor toward the object group contracts the layers. It is important to note that the expansion cursor 160 is an indicator and not a control. It is the action of moving the cursor toward or away from the object group while a modifier key is held down that controls the layer contraction and expansion. Indeed, another cursor image, e.g., an arrow, could be used or the cursor's image could remain unchanged. The use of an expansion cursor image should be construed as exemplary and not limiting. The process of expansion and contraction is illustrated in FIGS. 4-6 and described in detail below.

Figure 3:
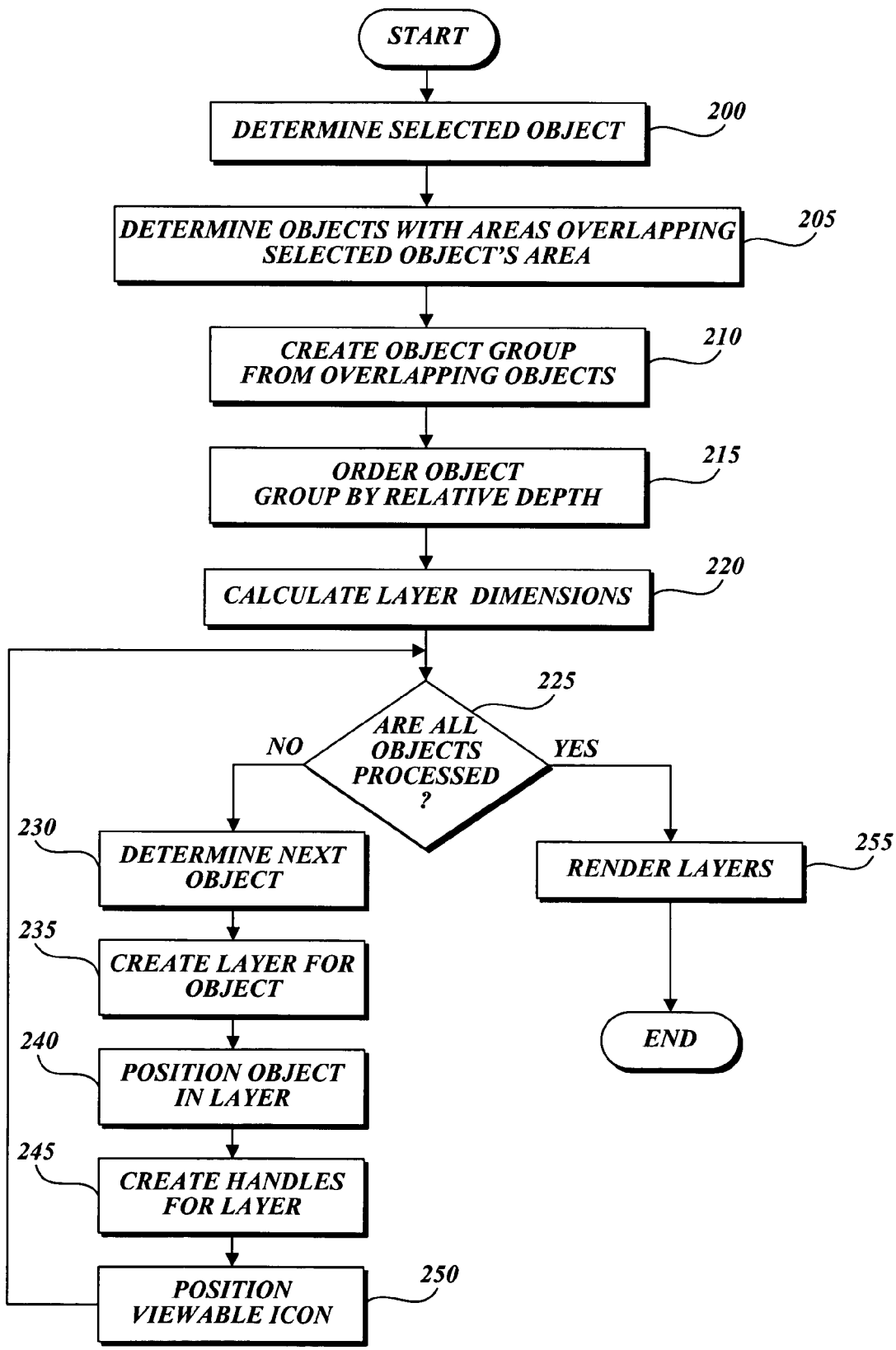
FIG. 3 is an exemplary functional flow diagram describing how a layer stack for an exemplary object group is created.

FIG. 3 is an exemplary functional flow diagram describing how layers, for example the layers shown in FIG. 2, are initially created and rendered. In FIG. 3, at block 200, a selected object is determined. At block 205, objects with areas overlapping the selected object's area are determined. At block 210, an object group is created from the overlapping objects. Alternatively, objects may be selected for an object group by using "select dragging," described above. The objects selected using select dragging form an object group. At block 215, the objects in the object group are ordered by their depth. At block 220, the X and Y layer dimensions are calculated. Calculating layer dimensions to encompass the objects in an object group is accomplished by taking the union of the bounding rectangles of all of the objects in the object group. Taking the union of the bounding rectangles produces a rectangle that encompasses all of bounding rectangles. For example, notice that each layer in the layer stack shown in FIG. 4 have the same width and height and that the width and height are large enough to encompass the outermost boundaries of all of the objects in the object group. Block 225 begins a loop in which the objects in the object group are processed. At block 225, a check is made to see if all of the objects in the object group have been processed. If all of the objects have not been processed, the control flows to block 230. At block 230, the next object in the object group is determined. At block 235, a layer is created for the object. At block 240, the object is located within the layer. At block 245, the X-handle and Y-handle are created for the object in the layer. At block 250, the viewability icon is positioned for that layer. If, at block 225, all of the objects have been processed, control flows to block 255. At block 255, all of the layers are rendered, e.g., as the layers are rendered in FIG. 2. After block 255, the process ends.

Figure 4:
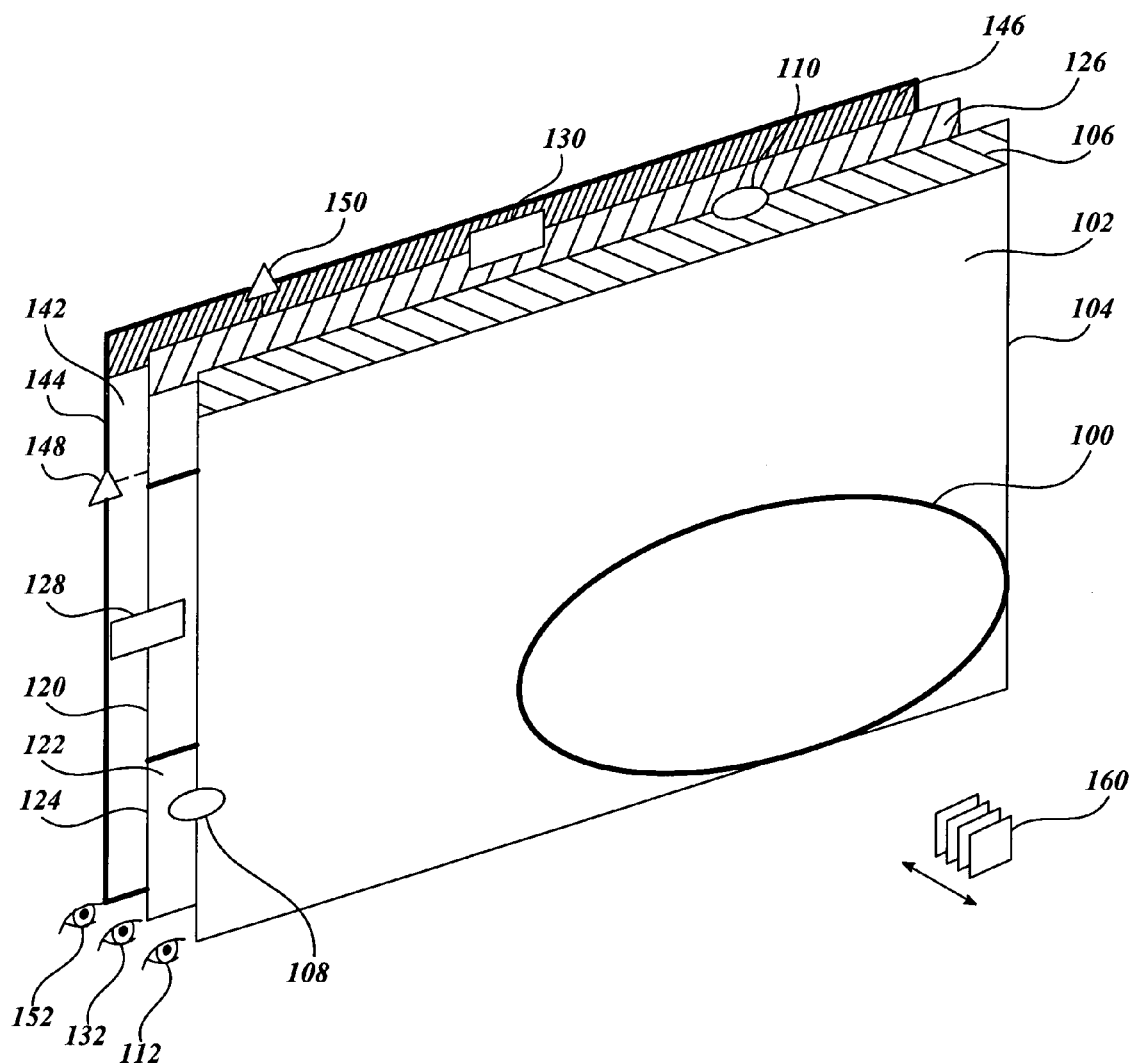
FIG. 4 is an illustration of the three exemplary overlapping objects shown in FIG. 1 placed in an exemplary layer stack with a small amount of space between the layers.

After the process described by FIG. 3 has been performed and the layers have been rendered as shown in FIG. 2, the layers may be expanded as shown in FIG. 4. The presence of the expansion cursor 160 indicates that the layers may be expanded or contracted. With the modifier key held down, moving the cursor diagonally away from the object group expands the layers and moving the cursor toward the object group contracts the layers. FIG. 4 shows the layers slightly expanded, i.e., with a small amount of space between the layers. Oval 100 is placed in layer 102 which has a border 104, a banner 106, X-handle 110, Y-handle 108, and visibility icon 112. Rectangle 120 is placed in layer 122 which has a border 124, a banner 126, X-handle 130, Y-handle 128, and visibility icon 132. Triangle 140 is placed in layer 142 which has a border 144, a banner 146, X-handle 150, Y-handle 148, and visibility icon 152.

Figure 5:
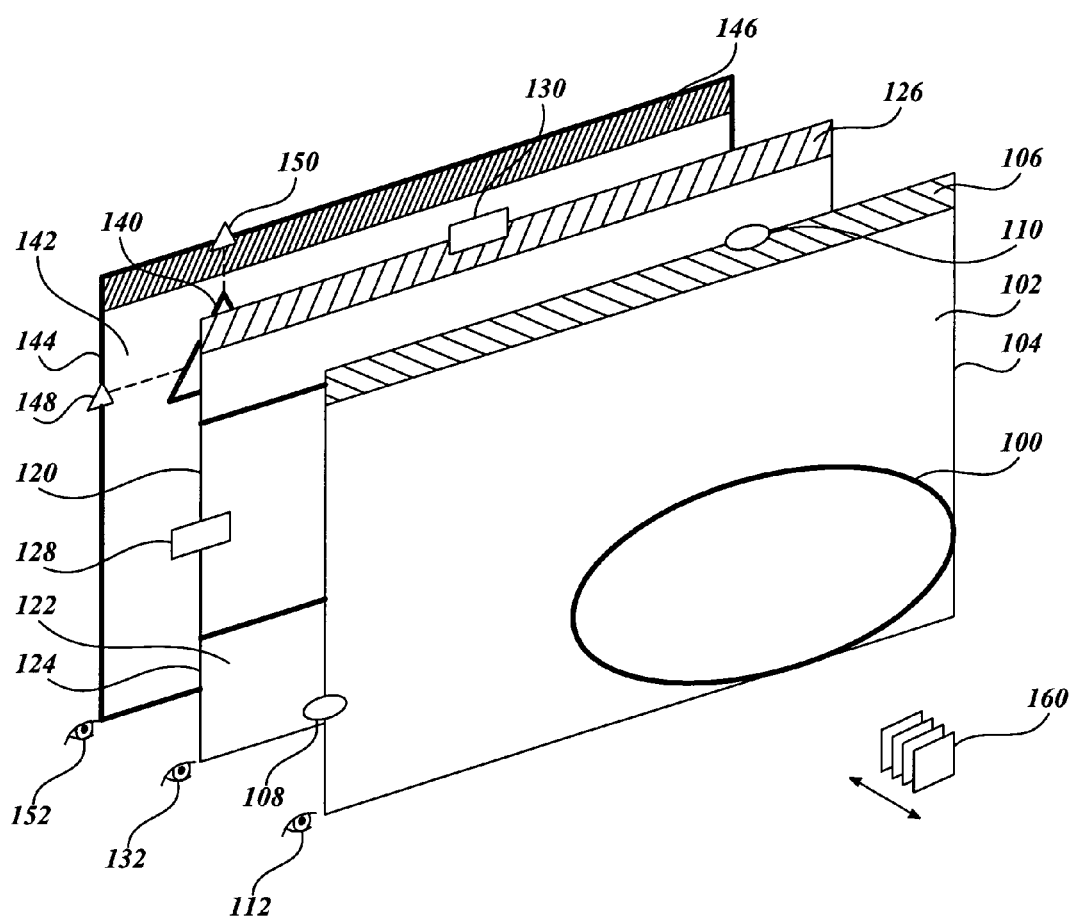
FIG. 5 is an illustration of the three exemplary overlapping objects shown in FIG. 1 placed in an exemplary layer stack with a medium amount of space between the layers.
Figure 6:
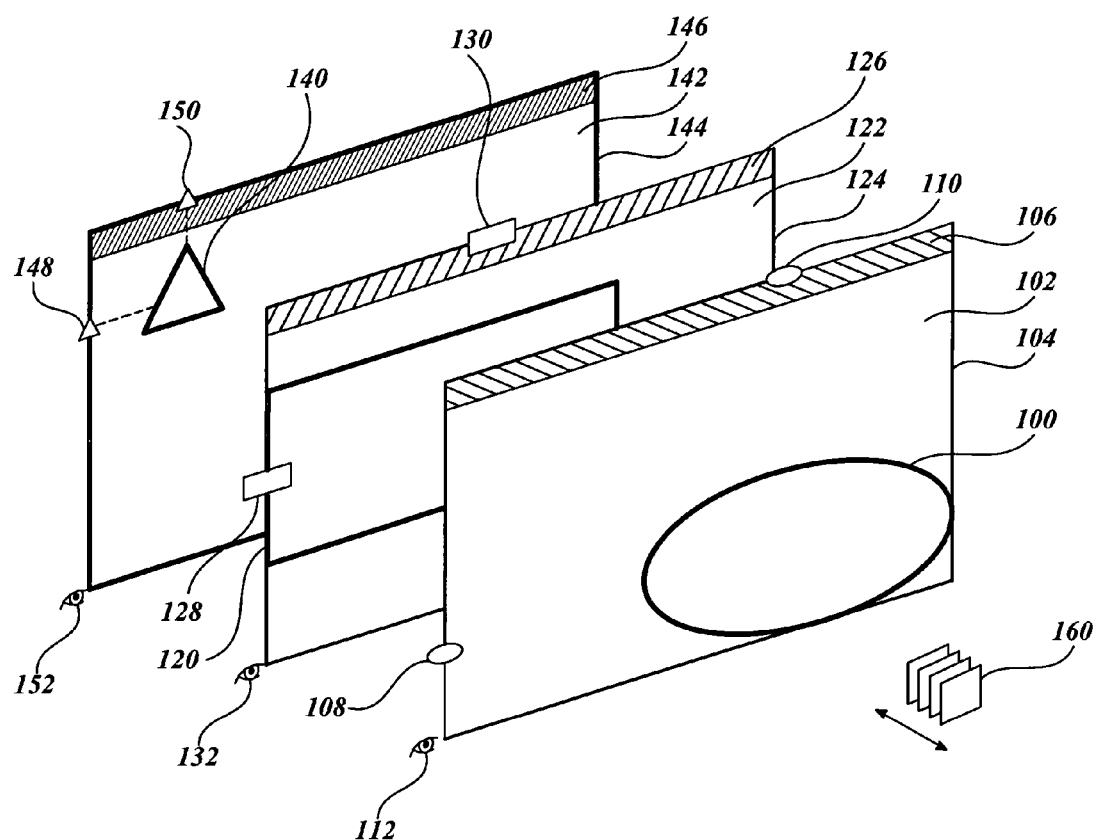
FIG. 6 is an illustration of the three exemplary overlapping objects shown in FIG. 1 placed in an exemplary layer stack with a large amount of space between the layers.

Moving the cursor diagonally away from the object group expands the layers to reveal more of each layer as shown in FIG. 5. In FIG. 5 there is a larger amount of space between the layers than in FIG. 4 making it more apparent that oval 100 is in layer 102 with border 104, banner 106, X-handle 110, Y-handle 108, and visibility icon 112; rectangle 120 is in layer 122 with border 124, banner 126, X-handle 130, Y-handle 128, and visibility icon 132; and triangle 140 is in layer 142 with border 144, banner 146, X-handle 150, Y-handle 148, and visibility icon 152. Expansion cursor 160 is visible. Moving the cursor diagonally away from the object group more fully expands the layers to provide even more space between the layers and expose even more of each layer as shown in FIG. 6. The expanded layers shown in FIG. 6 provide a less obstructed view of the objects. In FIG. 6, it can more easily be seen that oval 100 is in layer 102 with border 104, banner 106, X-handle 110, Y-handle 108, and visibility icon 112; rectangle 120 is in layer 122 with border 124, banner 126, X-handle 130, Y-handle 128, and visibility icon 132; and triangle 140 is in layer 142 with border 144, banner 146, X-handle 150, Y-handle 148, and visibility icon 152. Expansion cursor 160 is visible. In the above description, moving a cursor diagonally toward or away from an object group with a modifier key held down is a control to adjust the space between the layers. Other controls, such as but not limited to, pressing keyboard keys or clicking a special purpose button may be used to adjust the space between the layers. Hence, moving a cursor diagonally toward or away from an object group with a modifier key held down to adjust the space between the layers should be construed as exemplary and not limiting.

Notice in FIGS. 4-6, that border 144 of layer 142 is rendered with a thicker stroke than border 104 of layer 102 and border 124 of layer 122. A thick outline provides a visual cue to indicate a selected layer, e.g., layer 142. Preferably the layers for objects in an object group are rendered transparently or translucently in order to provide a clearer view of objects in the layers. Preferably the original view of the object group is rendered as a "ghost image." A ghost image is an image rendered in a lighter and/or more muted color than the original image. The ghost image of the object group is viewable through transparently or translucently rendered layers. Transparency, translucence, and lighter or muted colors are often indicated in black and white drawings, such as the drawings in the aforementioned figures, by using dashed and/or dotted lines. Because of the number and proximity of the objects and layers in the figures, using dashed and/or dotted lines tends to obscure and confuse rather than clarify the objects and layers. Hence, the objects and layers are shown in FIGS. 4-6 without attempting to represent transparency, translucence, or lighter or muted colors in order to more clearly illustrate the objects and layers.

Figure 7:
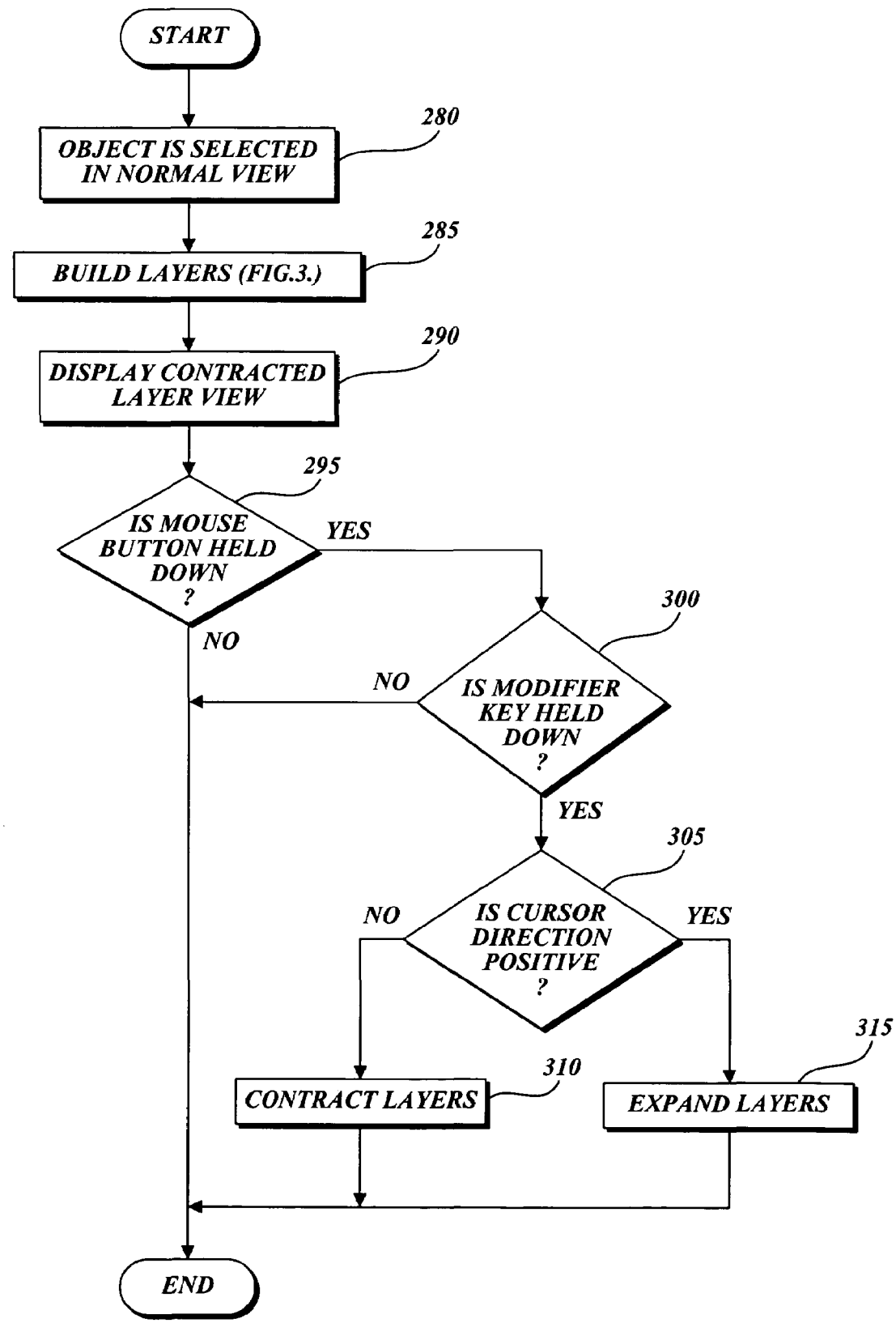
FIG. 7 is an exemplary functional flow diagram describing how a layer stack for an object group is expanded and contracted.

FIG. 7 is an exemplary functional flow diagram describing how layers, for example the layers shown in FIGS. 4-6, are expanded. The process starts at block 280 where an object is selected in a "flat" view, e.g., the view shown in FIG. 1. At block 285, layers are built using the process illustrated by the functional flow diagram shown in FIG. 3. At block 290, a contracted layer view, e.g., the view shown in FIG. 2, is displayed. At block 295, a check is made to see if the mouse button is held down. If the mouse button is not held down, the process ends. At block 295, if the mouse button is held down, control flows to block 300. At block 300, a check is made to see if the modifier key is held down. If the modifier key is not held down, the process ends. If the modifier key is held down, the control flows to block 305. At block 305, a check is made to see if the direction of cursor movement is positive, i.e., diagonally away from the from the object group. If the cursor direction is positive, the control flows to block 315. At block 315, the layers are expanded, as shown, for example, in the series of FIGS. 4 through 6. If the cursor direction is negative, i.e., diagonally toward the object group, control flows to block 310. At block 310, the layers are contracted. Contraction is illustrated by viewing FIGS. 4 through 6 in reverse order.

Figure 8:
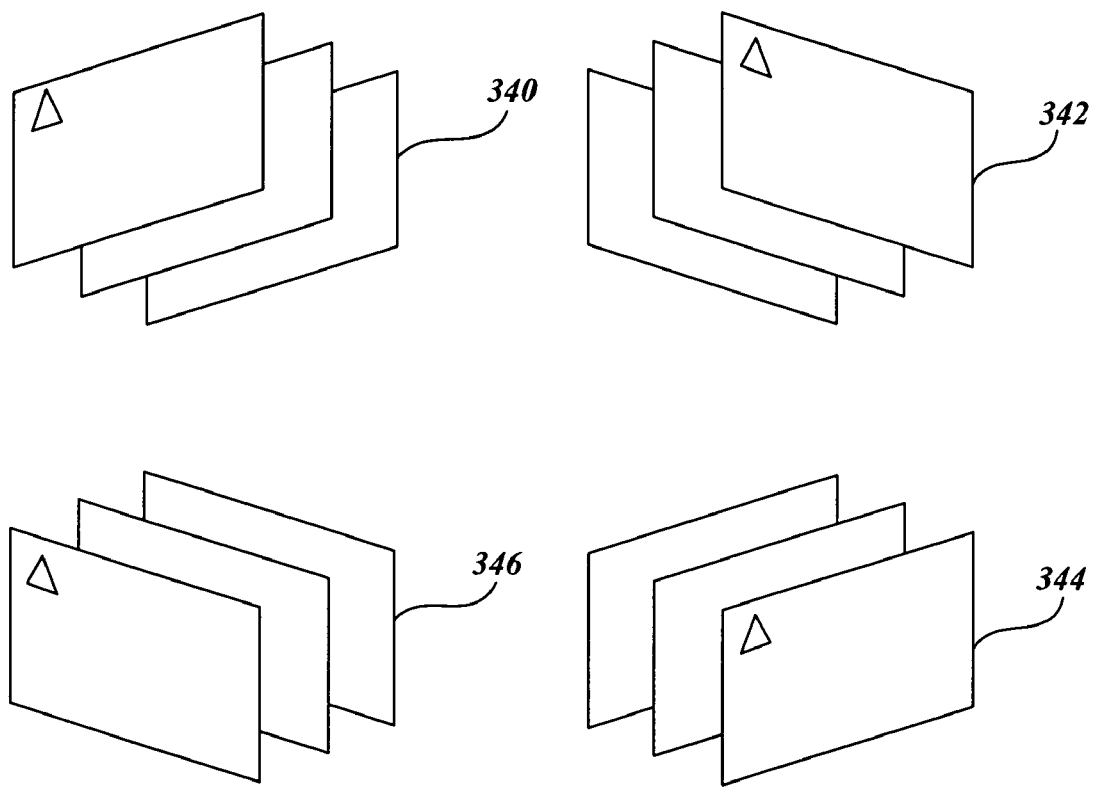
FIG. 8 is an illustration of an exemplary plurality of view orientations of an exemplary layer stack.

The exemplary functional flow diagram shown in FIG. 7 describes how objects may be made more accessible without changing visual attributes such as, but not limited to, shape, color, size, and position by providing axonometric views of layers, i.e., a layer stack, containing the objects. The angle at which the cursor is moved towards or away from the object group selects an angle at which a layer stack is viewed, i.e., a layer stack view orientation. Four exemplary layer stack views with unique orientations are southeast (SE), northeast (NE), northwest (NW), and southwest (SW). Other unique view orientations are possible and more or less than four unique view orientations may be used. The availability of the unique view orientations SE, NE, NW, and SW should be construed as exemplary and not limiting. FIG. 8 shows four exemplary layer stack views with unique orientations, North (N) being up. Starting in the upper left corner of FIG. 8, the exemplary layer stack views with unique orientations shown are NW 340, NE 342, SE 344, and SW 346. While a modifier key is held down the orientation of layer stack view may be selected by moving the cursor along an imaginary line approximately aligned with the desired layer stack orientation. The selection of a layer stack orientation operates along with the selection of expansion or contraction of the layers. For example, if a cursor is moved away from an object group at an angle that approximates a southeast, i.e., SE, direction, layers in a layer stack are expanded in a SE orientation, i.e., the layer stack orientation shown in FIGS. 3-6. The layer stack orientation and spacing, i.e., expansion, are set when the modifier key is released.

Figure 9:
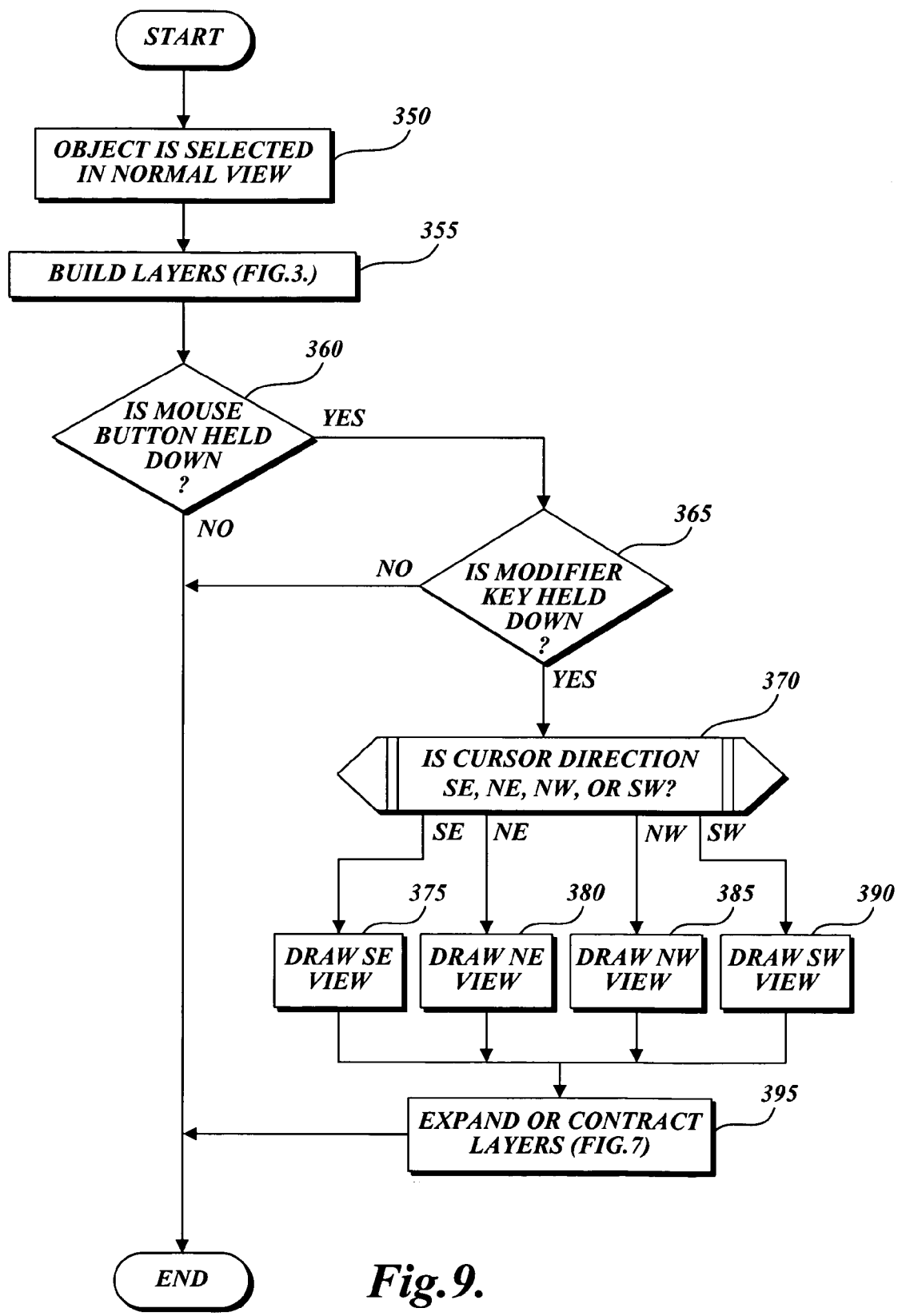
FIG. 9 is an exemplary functional flow diagram describing how an exemplary view orientation of an exemplary layer stack is selected from an exemplary plurality of view orientations of a layer stack.

FIG. 9 is a functional flow diagram describing how a layer stack view with a unique orientation is selected. The process begins at block 350 where an object is selected in a flat view, i.e., a view such as the view shown in FIG. 1. At block 355, layers are built, i.e., a layer stack is created, using the process illustrated by the functional flow diagram shown in FIG. 3. At block 360, the mouse button state is checked. If the mouse button state is held down, the process flows to block 365. If the mouse button is not held down, the process ends. At block 365, the state of the modifier key is checked. If the modifier key is not held down, the process ends. If the modifier key is held down, control flows to block 370. At block 370, a check is made to determine if the cursor direction is SE, NE, NW, or SW. If the cursor direction is SE, control flows to block 375. If the cursor direction is NE, control flows to block 380. If the cursor direction is SW, control flows to block 385. If the cursor direction is SW, control flows to block 390. At block 375, a SE oriented view of the layer stack is drawn. At block 380, a NE oriented view of the layer stack is drawn. At block 385, a NW oriented view of the layer stack is drawn. At block 390, a SW oriented view of the layer stack is drawn. After a layer stack view orientation has been determined and drawn, control flows to block 395. At block 445, the layer stack is expanded or contracted as shown in FIGS. 3-6 using the process described by the functional flow diagram shown in FIG. 7.

Figure 10:
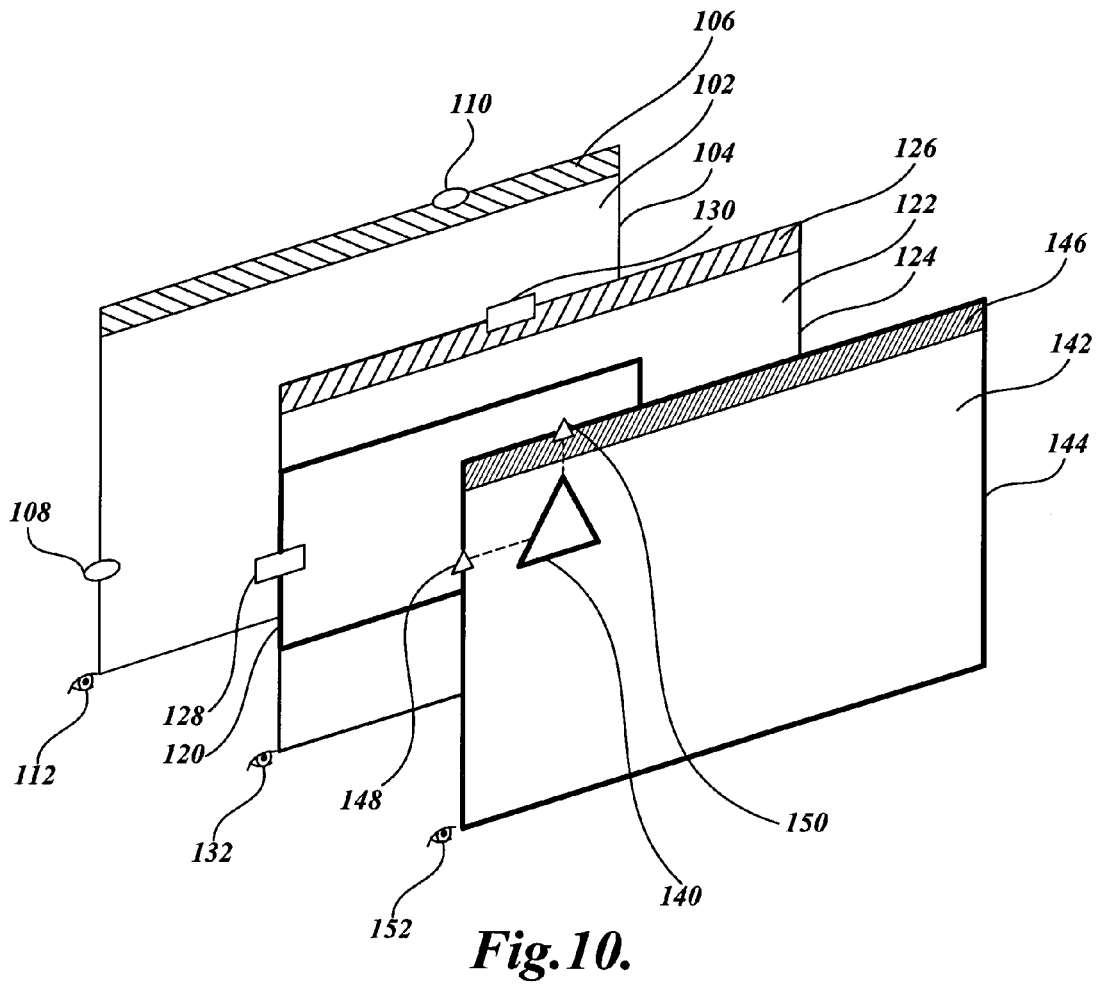
FIG. 10 is an illustration of an exemplary layer for the triangle shown in FIG. 6 with the layer's depth adjusted such that the triangle layer is at the top of the layer stack.
Figure 11:
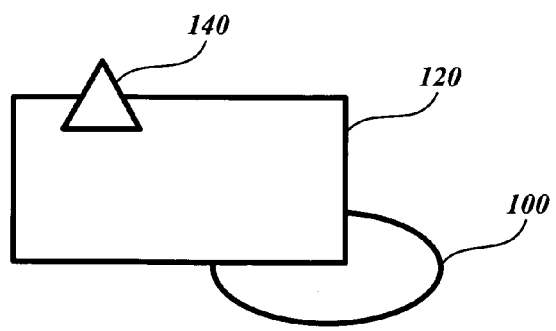
FIG. 11 is an illustration of the triangle shown in FIG. 6 moved to the top of an exemplary object group.

After a layer stack has been oriented and expanded as illustrated in FIGS. 1-9 and described above, the depth, i.e., the Z-index, of a layer within the layer stack may be adjusted by selecting the layer and dragging the layer to a new depth, i.e., the Z-index, within the layer stack. A layer is selected by clicking in an empty area of the layer. Alternatively, a user interface control, e.g., arrow keys, may be used to cycle through a layer stack to select a layer. Directly selecting a layer by clicking in an empty area of the layer should be construed as exemplary and not limiting. An example of adjusting the depth, i.e., the Z-index, of a layer is shown in FIG. 10 and the results of the adjustment can be seen in FIG. 11. In FIG. 10, oval 100, although obscured by layer 122, is in layer 102 with border 104, banner 106, X-handle 110, Y-handle 108, and visibility icon 112; rectangle 120 is in layer 122 with border 124, banner 126, X-handle 130, Y-handle 128, and visibility icon 132; and triangle 140 is in layer 142 with border 144, banner 146, X-handle 150, Y-handle 148, and visibility icon 152. An empty area of layer 142 has been clicked allowing layer 142 to be dragged to the front of the layer stack. After the dragging process is complete, i.e., the mouse button has been released, the layer stack is removed revealing a flat view of the object group, i.e., the view shown in FIG. 11. In FIG. 11, triangle 140 is now in front of rectangle 120. The dragging process provides a control to adjust the depth of the selected layer 142. The object, i.e., triangle 140, is displayed at the adjusted depth.

Figure 12:
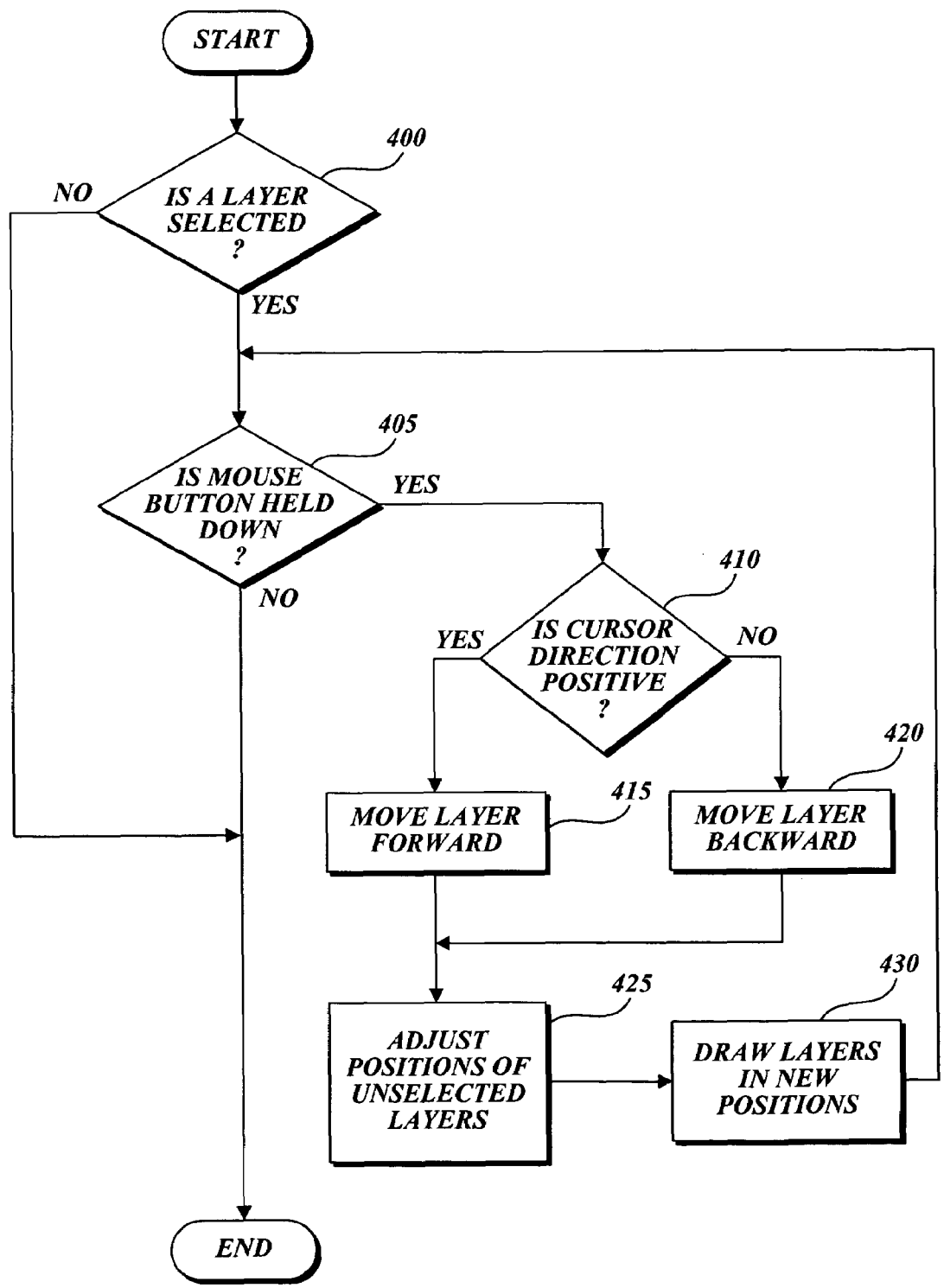
FIG. 12 is an exemplary functional flow diagram describing how an exemplary layer is moved within an exemplary layer stack.

The process of moving a layer forward or backward is described by the functional flow diagram shown in FIG. 12. At block 400, it is determined if a layer is selected. If a layer is not selected, the process ends. If a layer is selected, the control flows to block 405. At block 405 a check of the state of a mouse button is made. If the mouse button is held down, the process continues to block 410. If the mouse button is not held down, the process ends. At block 410, a check is made to see if the cursor direction is positive, i.e., the cursor is moving away from the center layer and toward the front of the layer stack. If the cursor direction is positive, the control flows to block 415. At block 415, the layer is moved forward. If at block 410 the cursor direction is not positive, i.e., toward the center of the object group and away from the front of the layer stack, then the control flows to block 420. At block 420, the layer is moved backward. Control flows from blocks 415 and 420 to block 425. At block 425, the positions of the unselected layers are adjusted, that is, moved backward or forward as required to accommodate the new position of the adjusted layer. At block 430, the layers are drawn in the new positions. The control flows back up to block 405 where a check is made to see if the mouse button is still held down. When the mouse button is finally released, the process ends. The action of selecting a layer and dragging the layer is a control for adjusting the depth of a selected layer.

Figure 13A:
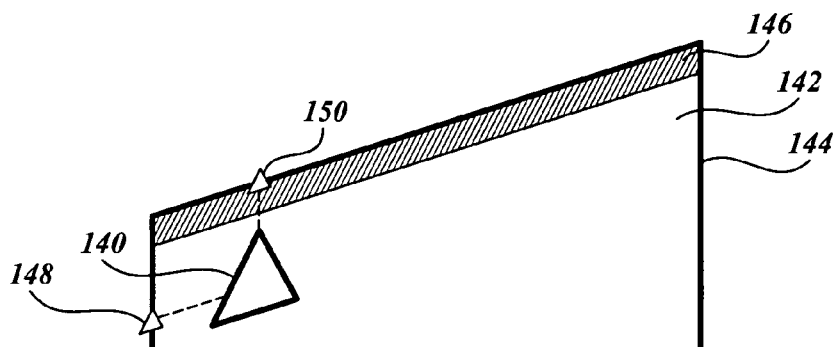
FIG. 13A is an illustration of an exemplary object and exemplary X and Y positioning handles in an exemplary layer.
Figure 13B:
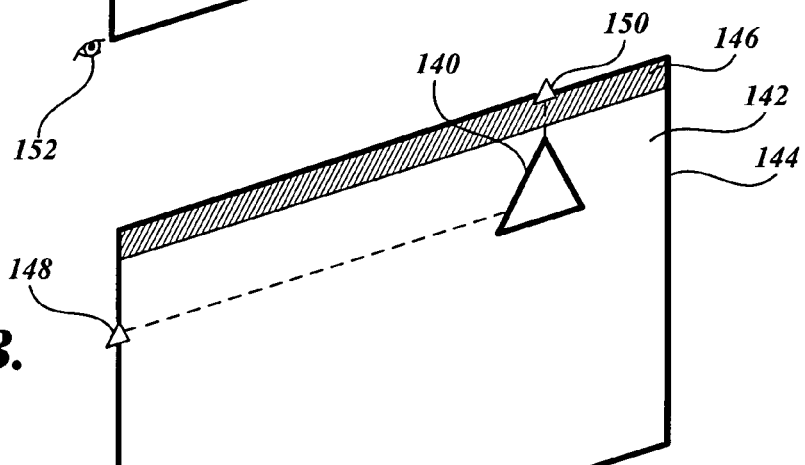
FIG. 13B is an illustration of the exemplary object and exemplary positioning handles in the layer shown in FIG. 13A after the X positioning handle has been moved.
Figure 13C:
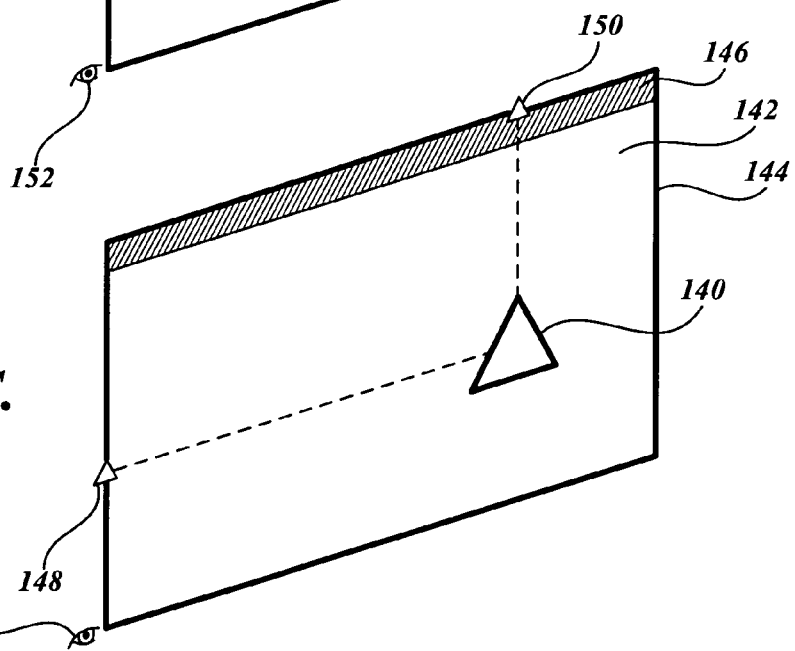
FIG. 13C is an illustration of the exemplary object and exemplary positioning handles in the layer shown in FIG. 13B after the Y positioning handle has been moved.

In addition to adjusting the depth of layers, as illustrated in FIGS. 10-12 and described above, the X and Y coordinates of an object in a layer can also be adjusted. An object can be moved in its layer using the X-handle and Y-handle associated with the object. The process of moving an object in a selected layer using the X-handle and Y-handle associated with the object is shown in FIGS. 13A-13C. In FIG. 13A, triangle 140 is on layer 142 having a border 144 and a banner 146. The visibility icon 152 is active, and the X-handle 150 and Y-handle 148 are connected to the object, i.e., triangle 140, by dashed lines. In FIG. 13B, triangle 140 is on layer 142 having border 144 and banner 146. The visibility icon 152 is active. The X-handle 150 has been moved to the right, dragging triangle 140 to the right such that the X coordinate of the X-handle 150 and the X coordinate of triangle 140 are the same. The Y-handle 148 remains stationary and the Y coordinate of triangle 140 does not change. In FIG. 13C, triangle 140 is on layer 142 having border 144 and banner 146. The visibility icon 152 is active. The X-handle 150 is in the same position as the X-handle 150 is in FIG. 13B. The Y-handle 148 is moved down, dragging triangle 140 down such that the Y coordinate of the Y-handle 148 and the Y coordinate of triangle 140 are the same. The X-handle 150 remains stationary and the X coordinate of triangle 140 does not change.

Figure 14:
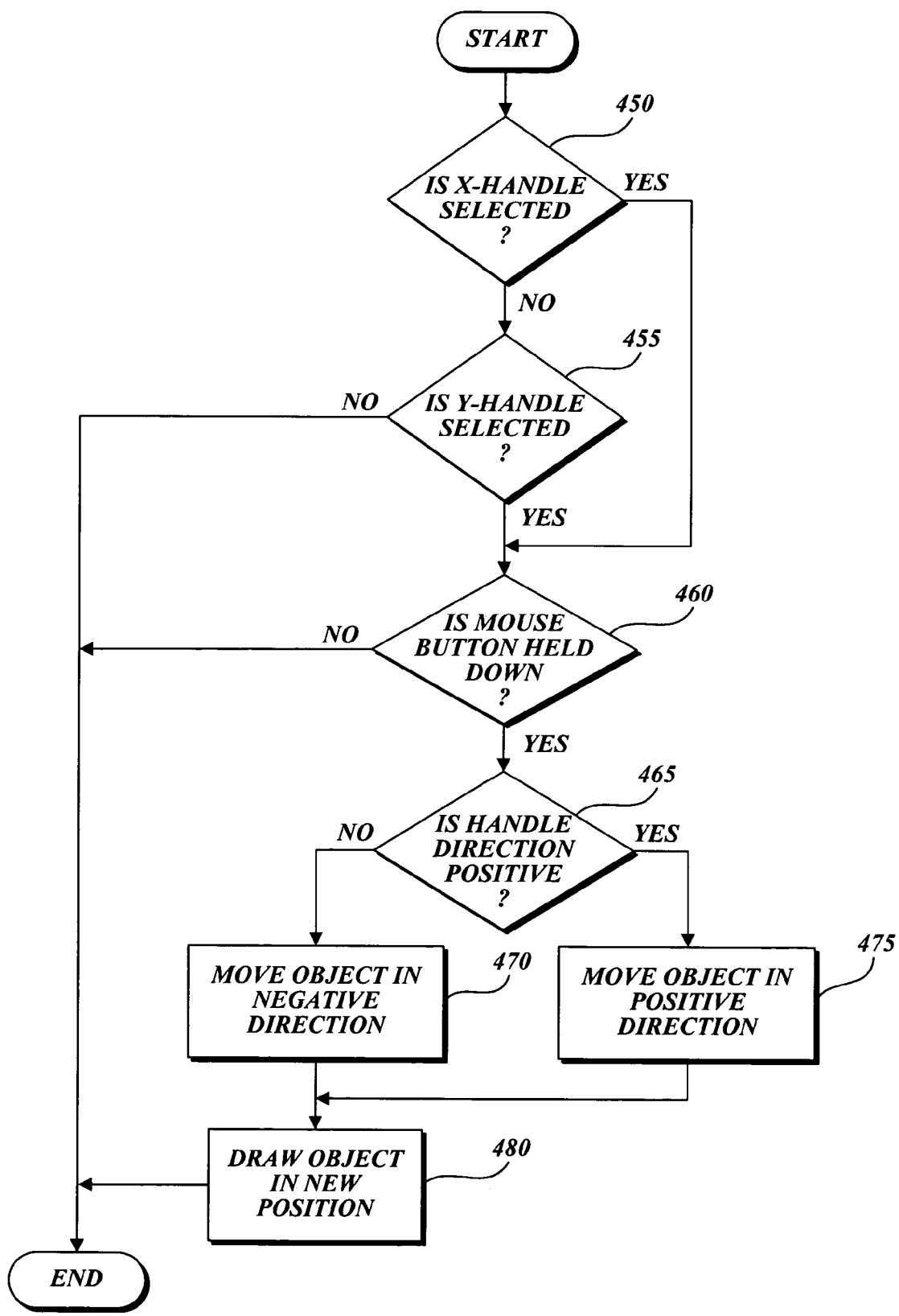
FIG. 14 is an exemplary functional flow diagram describing how an exemplary object in an exemplary layer is positioned using X and Y positioning handles.

An exemplary process of moving an object in the layer is described in the functional flow diagram shown in FIG. 14. At block 450, a check is made to determine if the X-handle, e.g., X-handle 150, is selected. If the X-handle is not selected, control flows to block 455. If the X-handle is selected, control flows to block 460. At block 455, a check is made to determine if the Y-handle, e.g., Y-handle 148, is selected. If at block 455 the Y-handle is not selected, the process ends because neither the X-handle nor the Y-handle have been selected. If at block 455 the Y-handle is selected, control flows to block 460. At block 460, a check is made to determine if the mouse button is held down. If the mouse button is not held down, the process ends. If the mouse button is held down, the control flows to block 465. At block 465, a check is made to determine the direction of handle movement. If the handle is an X-handle, moving to the right is the positive direction and moving left is the negative direction. If the handle is a Y-handle, moving down is the positive direction and moving up is the negative direction in keeping with the convention for computer screen rendering. If the handle direction is positive, control flows to block 475. If the handle direction is negative, control flows to block 470. At block 475, the object, e.g., triangle 140, is moved in the positive direction along the X axis if the handle is an X-handle or along the Y axis if the handle is a Y-handle. At block 470, the object is moved in the negative direction along the X axis if the handle is an X-handle or along the Y axis if the handle is a Y-handle. Control flows from blocks 470 and 475 to block 480. At block 480 the object, i.e., triangle 140, is drawn in the position set using the X-handle or Y-handle. After block 480, the process ends.

Figure 15A:
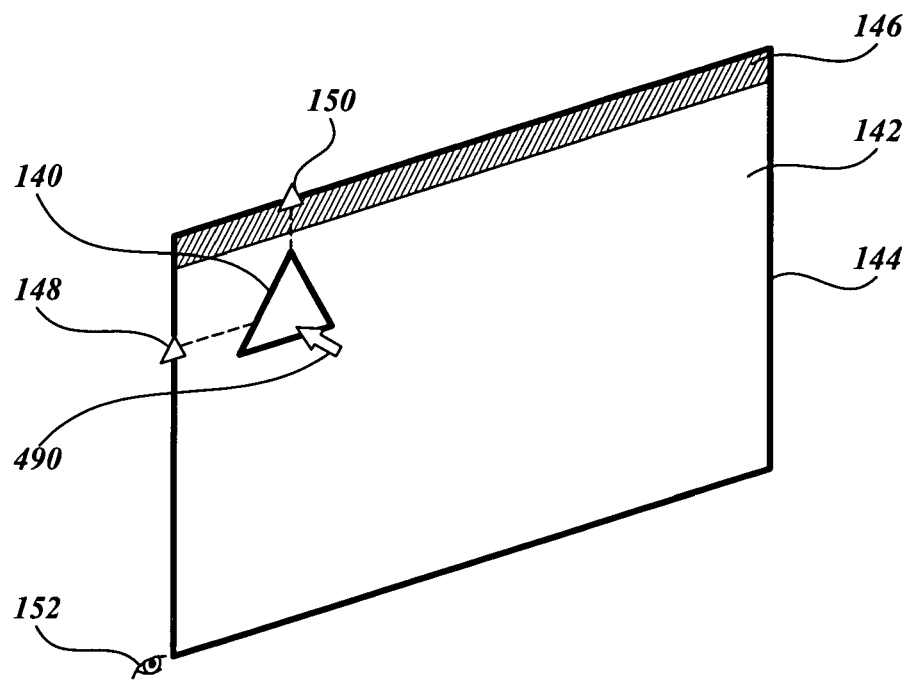
FIG. 15A is an illustration of an exemplary selected object and exemplary positioning handles in an exemplary layer.
Figure 15B:
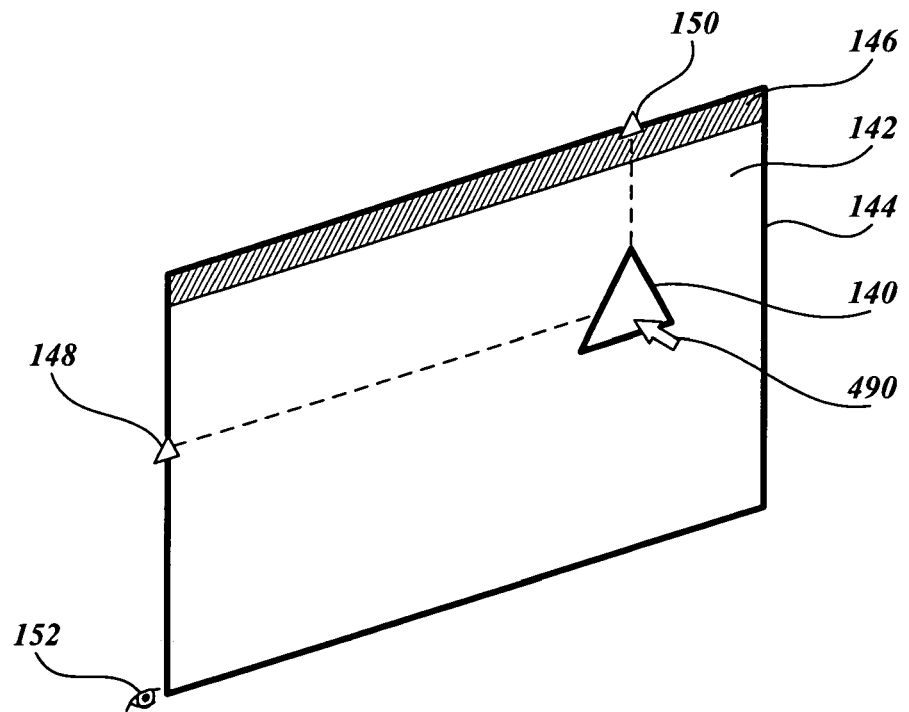
FIG. 15B is an illustration of the selected object and positioning handles in the layer shown in FIG. 15B repositioned by dragging within the layer.

The process of moving an object in a layer illustrated by the functional flow diagram shown in FIG. 14 and described above is exemplary. Another way to move an object in a layer is to click on the object and drag the object to a new position using the X-handle and Y-handle as indicators of the object's X coordinate and Y coordinate, respectively. The process of clicking on an object and dragging the object to a new position in a layer is shown in FIGS. 15A-15B. In FIG. 15A, triangle 140 is in layer 142 having border 144 and banner 146. The visibility icon 152 is active and the X-handle 150 and Y-handle 148 are attached to the triangle 140 with dashed lines. An arrow cursor 490 is positioned over the triangle 140. The triangle 140 is dragged downward and to the left to a new position as shown in FIG. 15B. In FIG. 15B, triangle 140 is in layer 142 having border 144 and banner 146. The visibility icon 152 is active and the X-handle 150 and Y-handle 148 are attached to the triangle 140 with dashed lines. The arrow cursor 490 is positioned over the triangle 140. Preferably, if the object being moved, i.e., triangle 140, overlaps or occludes objects, e.g., oval 100 and rectangle 120 in other layers, e.g., layers 102 and 122, of a layer stack, the object being moved casts an "outline shadow" on the corresponding layers to provide a reference for alignment in the other layers. An exemplary outline shadow is shown in FIG. 17B and described below.

Figure 16:
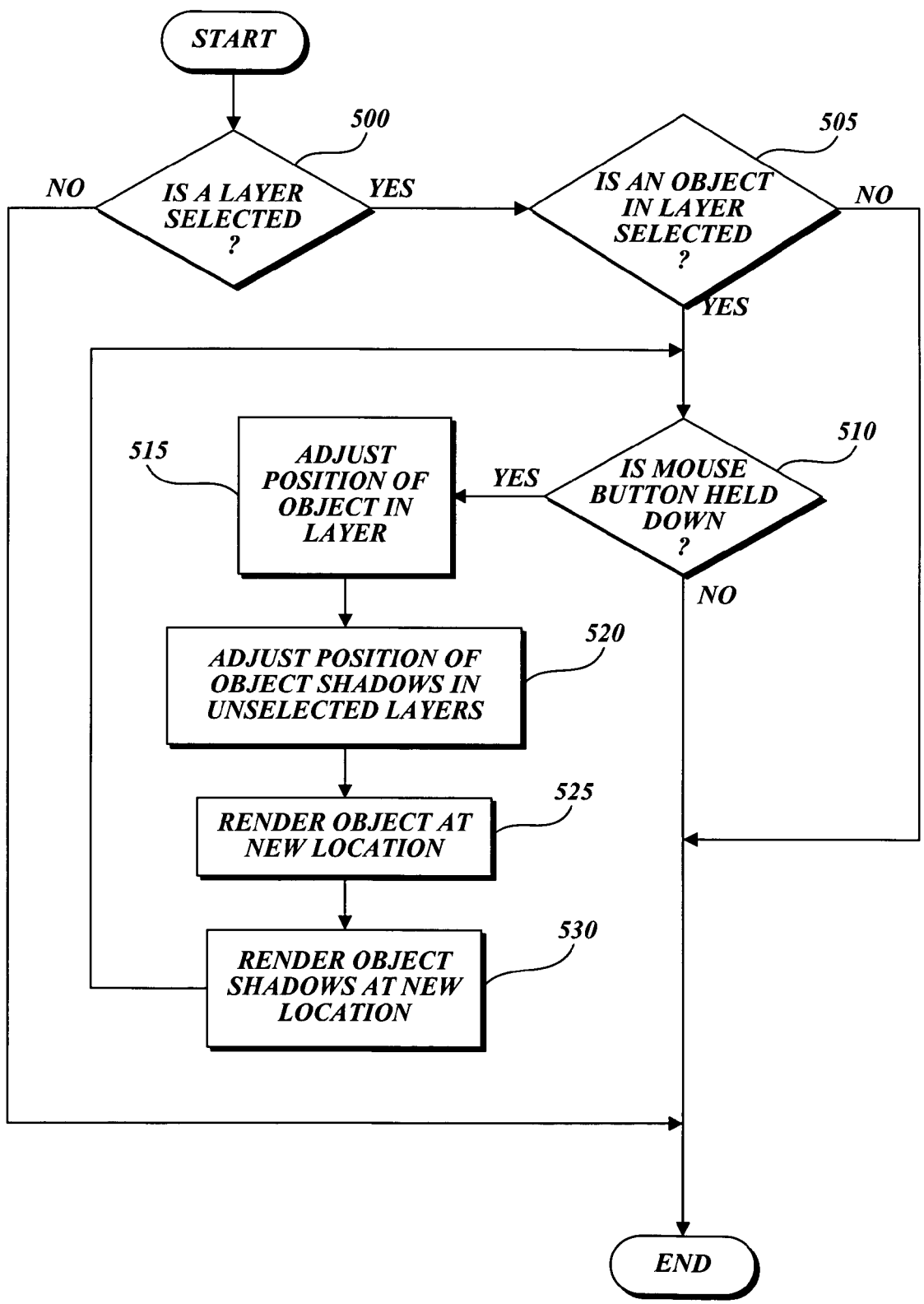
FIG. 16 is a exemplary functional flow diagram describing how an exemplary object in an exemplary layer is positioned by selecting and dragging the object.

An exemplary process of moving an object in a layer by selecting an object and dragging the object is illustrated by the functional flow diagram in FIG. 16. At block 500, a check is made to determine if a layer is selected. If a layer is not selected, the process ends. If a layer, e.g., layer 142, is selected, the control flows to block 505. At block 505, a check is made to determine if an object in the layer is selected. If an object in the layer is not selected, the process ends. If an object in the layer, e.g., triangle 140, is selected, the control flows to block 510. At block 510, a check is made to determine if the mouse button is held down. If the mouse button is not held down, i.e., the mouse button has been released, the process ends. If the mouse button is held down, the control flows to block 515. At block 515, the position of the object, i.e., triangle 140, is adjusted within the layer, i.e., layer 142. At block 520, the positions of the object's shadows, i.e., the shadows of triangle 140, in the unselected layers, i.e., layers 102 and 122, are adjusted. At block 525, the object, i.e., triangle 140, is rendered at the object's new location in the layer, i.e., layer 142. At block 530, the object's shadows on the unselected layers are rendered at the new location. Control flows back to block 510. If, at block 510, the mouse button is not held down, i.e., the object is no longer being repositioned, the process ends.

Preferably, during the repositioning processes pictorially illustrated in FIGS. 13A-13C and 15A-15B and functionally illustrated in FIGS. 14 and 16 and described above, if an object is moved such that the union of the bounding rectangles of the objects changes, the layer dimensions change.

For example, if triangle 140 is moved into the upper right corner of layer 142 and "pushed against" the upper right corner of border 144, the border expands to encompass triangle 140 at triangle 140's new position. For another example, if triangle 140 is moved down, i.e., away from the upper edge of border 144, the upper edge of border 144 moves down to "shrink" the area of layer 142 while still encompassing triangle 140 at triangle 140's new, lower position.

Preferably, visual cues to help distinguish one layer from another are provided. An exemplary visual cue for distinguishing layers is layer specific color, i.e., providing a unique and distinctive color for each layer in a layer stack. As discussed above, to improve the visibility of overlapping layers, it is preferable for layers to be transparent, hence a layer's color is a transparent tint. For example, in the layer stack shown in FIG. 6, layer 102 may be tinted red, layer 122 may be tinted green, and layer 142 may be tinted blue. A layer's border may be colored with a darker tint of the assigned color. For example, layer 102's border may be colored a darker red than the area inside the border. When a layer is selected, the layer's colored border is rendered with a thicker stroke. When the layer is deselected, i.e., another layer is selected, the layer's colored border is rendered with a thinner stroke, i.e., the original or minimal border thickness.

Preferably, as a cursor is moved over the layers in a layer stack, visual cues are provided to indicate which layer a cursor enters. An exemplary visual cue for indicating when a cursor enters a layer, i.e., is moved on or inside of the layer's border, is to "shake" the layer briefly. Shaking is an animation technique in which a layer is repeatedly moved around a small, circular path for a few seconds. For example, in the layer stack shown in FIG. 6, when a cursor is located over layer 142, layer 142 is shaken. The layer 142 shaking may comprise moving the center of layer 142 repeatedly and quickly around a five pixel wide circle for two seconds, for example. When the cursor is moved outside of layer 142, layer 142 stops shaking. If the cursor remains inside of layer 142 for two seconds or more, layer 142 stops shaking and "spotlighting" is used to further indicate that the cursor is inside layer 142. Spotlighting is a visual technique which provides a hazy "spotlight" of color around the cursor. The color is the assigned color of the layer, e.g., blue for layer 142. The color is darkest and most intense immediately surrounding the cursor and fades into a tint of the color further away from the cursor. As the cursor is moved, the spotlight moves with the cursor. The spotlight appears only within a layer's border and hence is trimmed as the cursor approaches a layer's border.

Figure 17A:
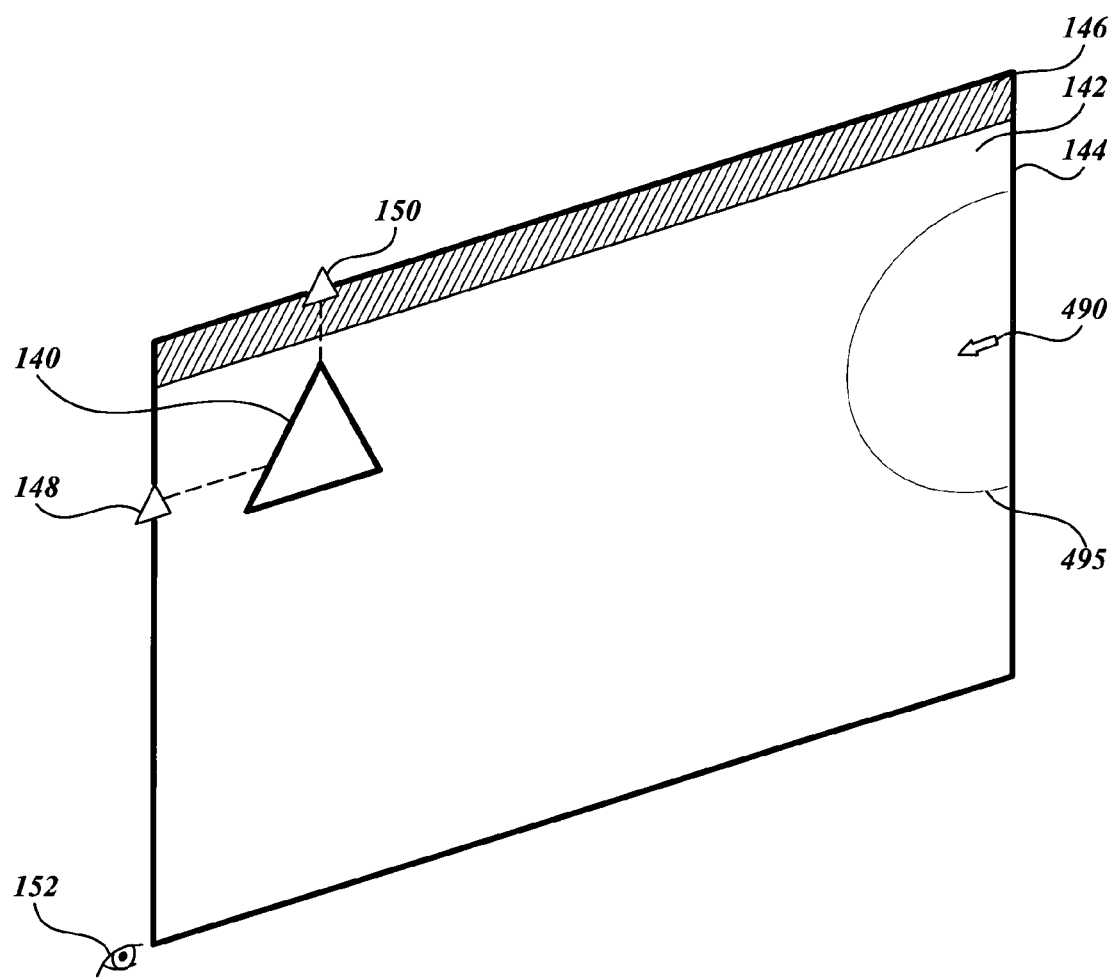
FIG. 17A is an illustration of an exemplary layer containing an exemplary object, exemplary positioning handles for the object, and an exemplary "spotlight" surrounding an exemplary cursor to help visually define the boundaries of the layer.
Figure 17B:
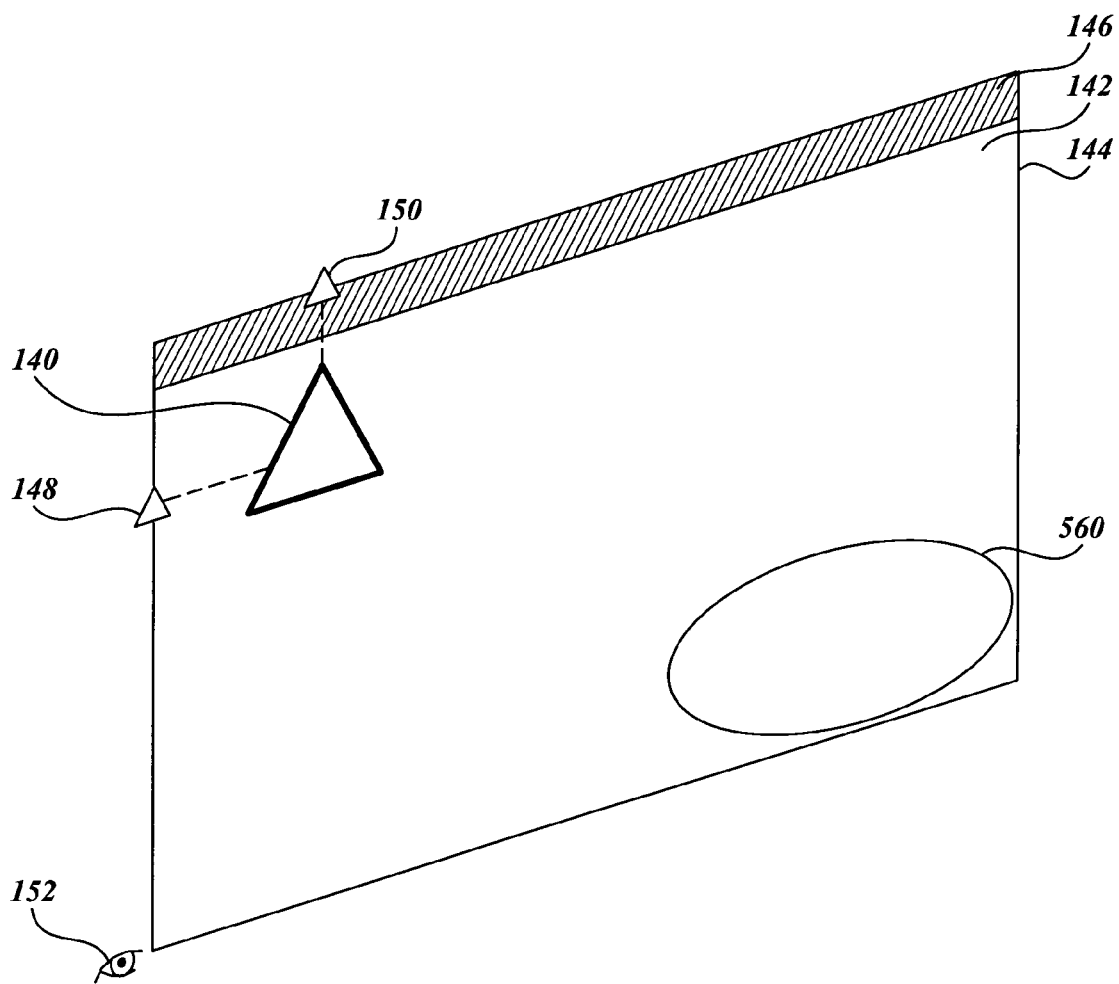
FIG. 17B is an illustration of an exemplary layer containing an exemplary object, exemplary positioning handles for the object, and a shadow outline of an object in another layer in the layer stack.

FIG. 17A illustrates how an exemplary spotlight 495 is used to indicate which layer a cursor is in and to help indicate the edges of layers. Triangle 140 is on layer 142 with border 144, banner 146, and visibility icon 152. X-handle 150 and Y-handle 148 are connected to triangle 140 by dashed lines. Spotlight 495 surrounds cursor 490. Notice that the spotlight 495 is cut off by the border 144 providing a clearer indication that the cursor 490 is in layer 142 and providing a clearer indication of the edge of layer 142. The border 144 is rendered with a thick stroke. The thicker border 144 indicates that layer 142 is selected.

FIG. 17B illustrates how an exemplary outline shadow, i.e., shadow, 560 is used to indicate the position of an object on a layer other than the viewed layer. Triangle 140 is on layer 142 with border 144, banner 146, and visibility icon 152. X-handle 150 and Y-handle 148 are connected to triangle 140 by dashed lines. A shadow 560 for oval 100 is placed in layer 142 in the same position as oval 100 is placed in layer 102. Notice that the shadow 560 is rendered with a thin stroke. Preferably, shadows are also rendered in a muted color. Notice that the border 144 is thin and not thick, as border 144 is in FIG. 17A. The thin border 144 indicates that the layer is not selected.

Figure 18:
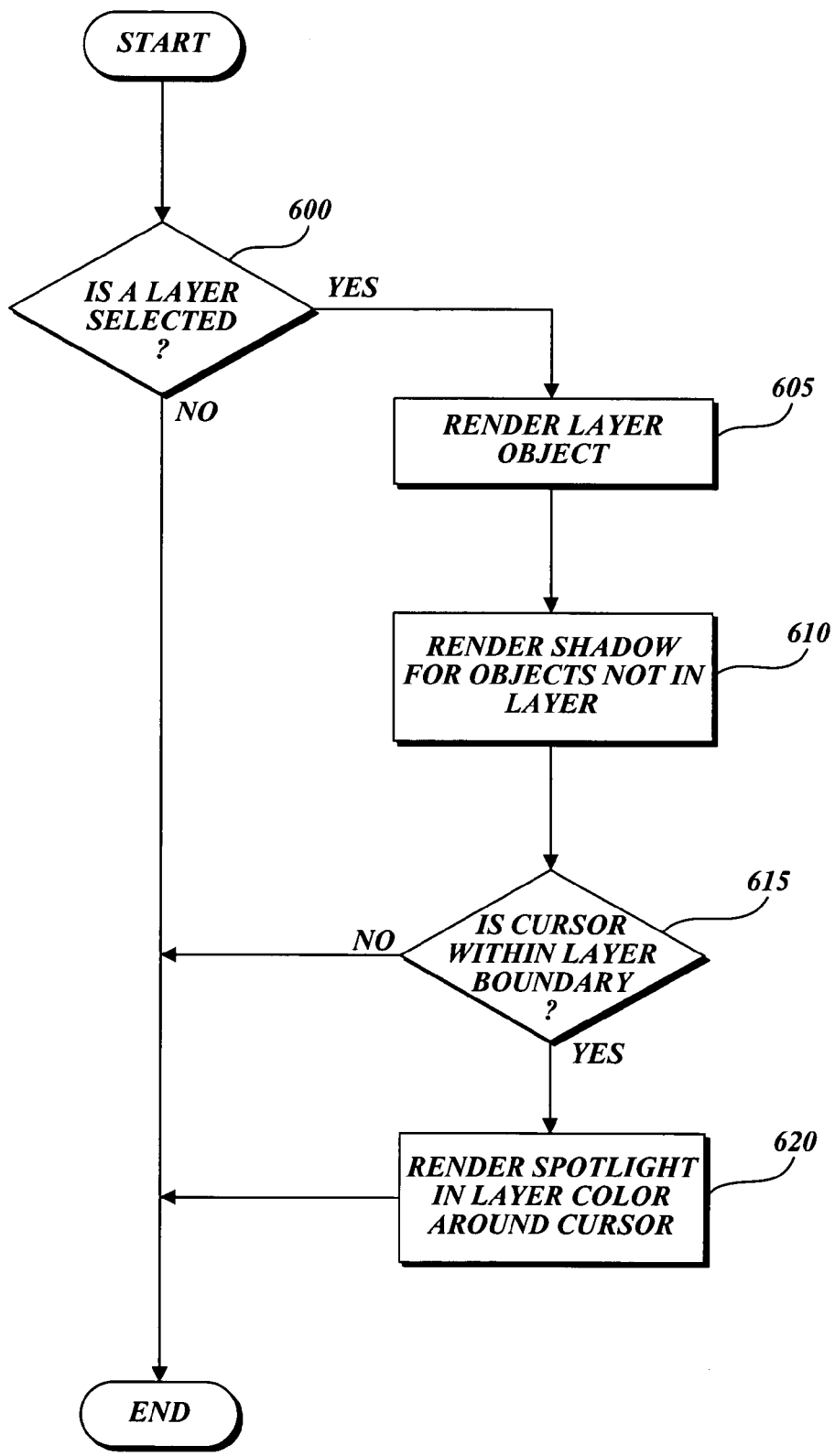
FIG. 18 is an exemplary functional flow diagram describing how the contents of an exemplary layer are displayed.

FIG. 18 is a functional flow diagram showing how a selected layer is rendered with shadows and a spotlight. At block 600, a layer is selected, e.g., layer 142 as shown in FIG. 17A. If a layer is not selected at block 600, the process ends. At block 605, the object in the layer, i.e., triangle 140, is rendered. At block 610, shadows for objects in other layers of the layer stack, i.e., objects that are not in the selected layer, are rendered. For example, oval 100's shadow 550 and rectangle 120's shadow 560 are rendered. At block 615, a check is made to determine if the cursor 490 is within the selected layer's border 144. If the cursor 490 is within the selected layer's border 144, the control flows to block 620. At block 620, a spotlight, e.g., spotlight 495, centered around the cursor 490's location, is rendered in the selected layer, i.e., layer 142. If the cursor 490 is not within the layer's border 144, the process ends.

Figure 19:
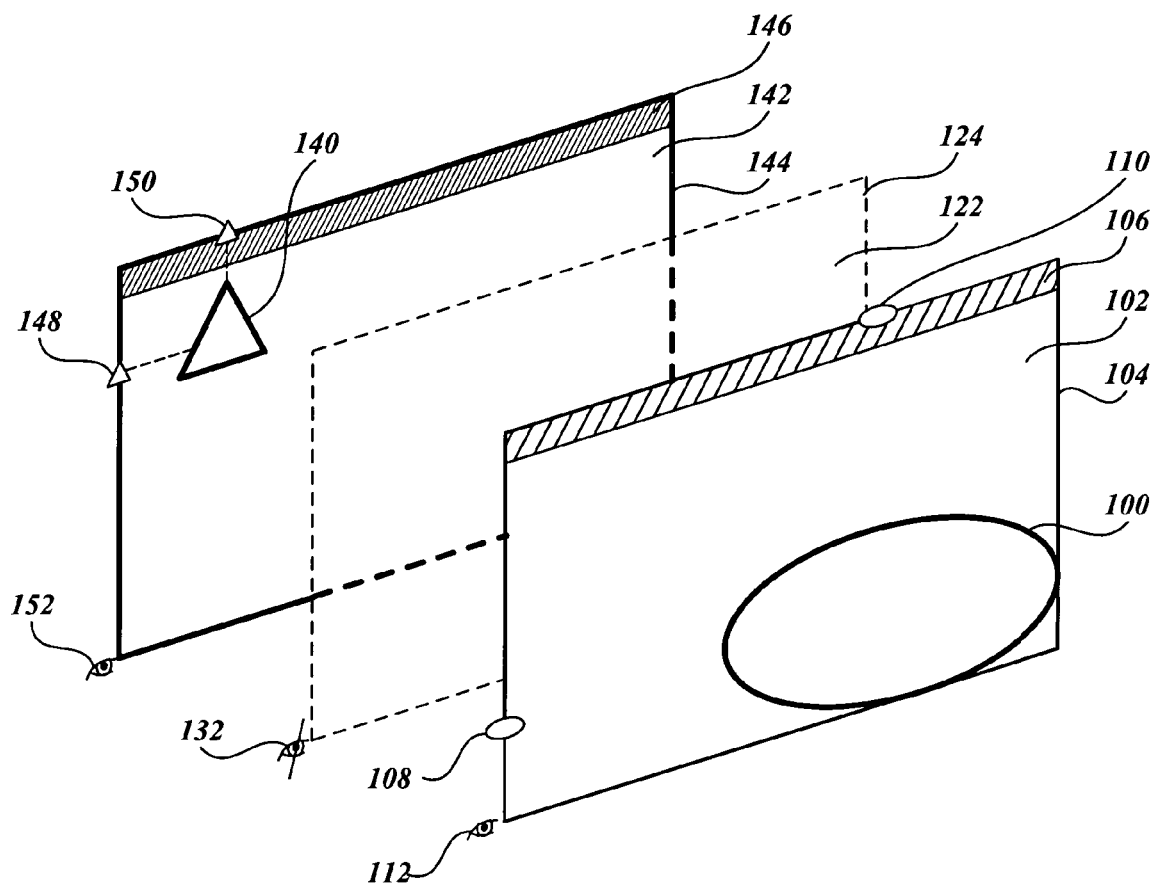
FIG. 19 is an illustration of an exemplary layer stack in which the visibility of an exemplary layer is deactivated.

In order to reduce the visual clutter caused by too many objects and/or layers without losing track of the layers, layers may be made effectively "invisible" by deactivating the layers' visibility icons. An example of using a visibility icon is shown in FIG. 19. Triangle 140 is on layer 142 having border 144, banner 146, X-handle 150, Y-handle 148 and visibility icon 152. Oval 100 is on layer 102 having border 104, banner 106, X-handle 110, Y-handle 108, and visibility icon 112. The visibility icon 132 for layer 122 has been clicked causing a slash to be drawn through the visibility icon 132 and also causing the items on layer 122, i.e., rectangle 120, X-handle 130, and Y-handle 128, to be temporarily erased, i.e., hidden. The border 124 is rendered as a dashed line and, preferably, rendered in a muted color. Preferably the layer 122 is rendered as transparent to permit the other layers in the layer stack to be more easily visible.

Figure 20:
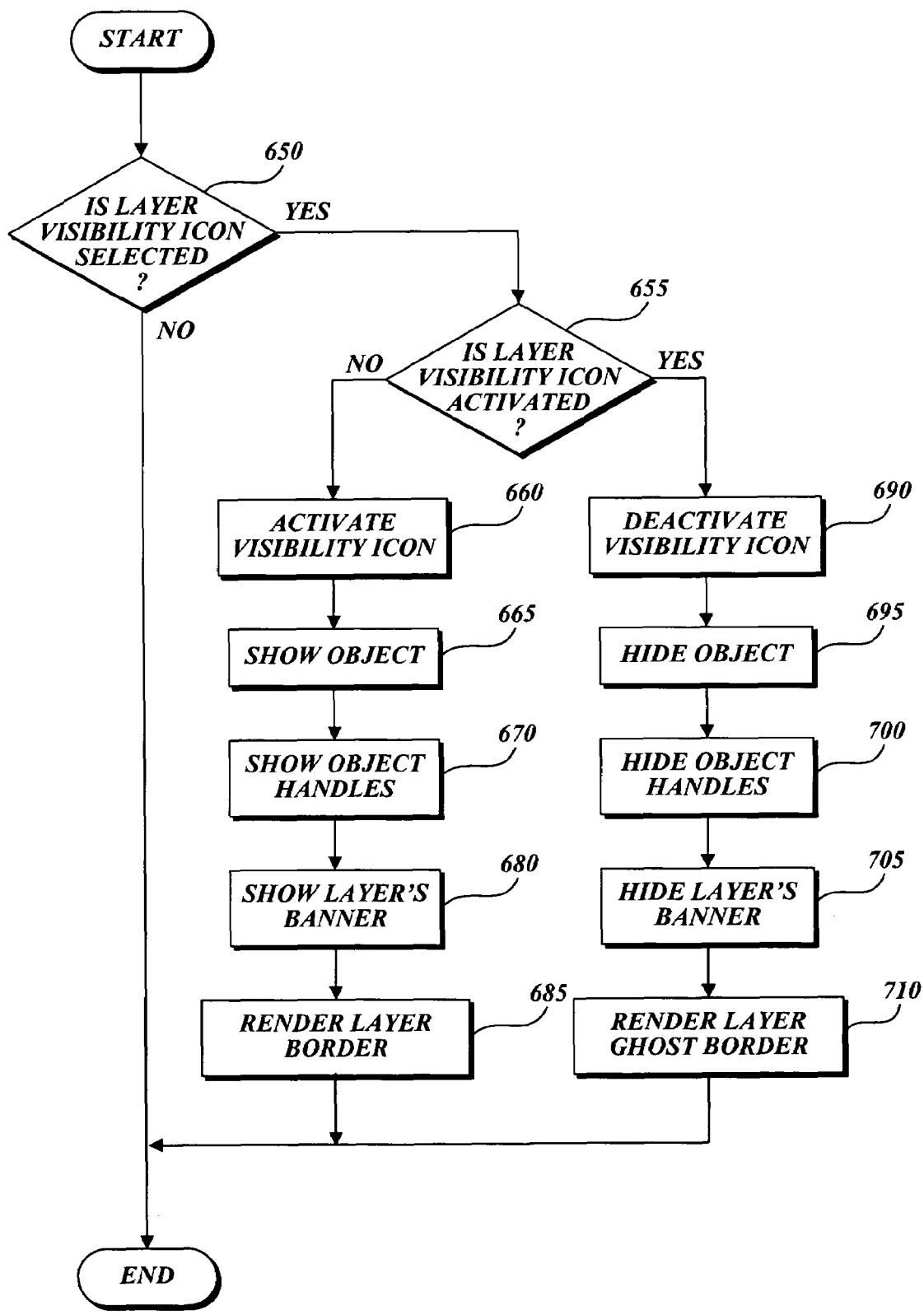
FIG. 20 is an exemplary functional flow diagram describing how the visibility of an exemplary layer in an exemplary layer stack is activated and deactivated.

The process of rendering a layer according to the state of the visibility icon associated with the layer is shown in the functional flow diagram in FIG. 20. At block 650 a check is made to determine if the layer's visibility icon is selected. If the layer's visibility icon is not selected, the process ends. If the visibility icon is selected, the control flows to block 655. At block 655, a check is made to see if the visibility icon is activated. If the visibility icon is activated, the layer itself is visible. If the visibility icon, e.g., visibility icon 132, is deactivated, i.e., has a hash mark through it, the layer, e.g., layer 122, associated with the visibility icon 132 is rendered as transparent and the border, e.g., border 124, is rendered as a dashed line. If the visibility icon 132 is inactive and unselected, the visibility icon 132 becomes active. Similarly, if the visibility icon 132 is active when the visibility icon 132 is selected, the visibility icon 132 becomes deactivated. If the visibility icon 132 is activated, the control flows to block 690. At block 690, the visibility icon 132 is deactivated, that is, a hash mark drawn through visibility icon 132. At block 695, the object, e.g., rectangle 120, is hidden. At block 700, the X-handle and Y-handle, e.g., X-handle 130 and Y-handle 128, are hidden. At block 705, the banner, e.g., banner 126, is hidden. At block 710, the border, e.g., border 124, is rendered as a ghost border, i.e., a dashed line. If, at block 655, the visibility icon 132 is not activated, control flows to block 660. At block 660, the visibility icon 132 is activated. At block 665, the object, i.e., rectangle 120, is shown. At block 670, the handles, i.e., X-handle 130 and Y-handle 128, are shown. At block 675, the banner, i.e., banner 126, is shown. At block 680, the banner, i.e., banner 126, is shown. At block 685, the border, i.e., border 124, is rendered in a solid line. After blocks 685 and 710, the process ends.

Preferably, the actions of creating a layer stack, selecting a layer stack orientation, adjusting the depth of layers in a layer stack, and adjusting the position of an object in a layer may be terminated by contracting the layer stack or by clicking in an area of the screen outside of the layer stack.

While illustrative embodiments have been illustrated and described, it will be appreciated that various changes can be made therein without departing from the spirit and scope of the invention. For example, more than one layer may be selected and the depth of the group of selected layers may be adjusted. Another example is the calculation of layer dimensions. It is possible to calculate the layer dimensions to enclose the objects in the object group by taking the union of the outlines of the objects. Thus, calculating layer dimensions by taking the union of bounding rectangles of the objects should be construed as exemplary and not limiting.

The embodiments of the invention in which an exclusive property or privilege is claimed are defined as follows:

1. A method of providing a layered view of a group of objects while preserving the visual attributes of the objects, the method comprising the following steps executed by a least a processor:
   a. analyzing a 2D image depicting a plurality of overlapping objects in a single layer for determining which objects are to be included in a group of objects, the determination being based at least on which objects overlap a selected object in the 2D image;
   b. calculating dimensions of layers that encompass the objects in the group by determining the union of the bounding rectangles of the objects in the group, wherein each layer has substantially a same width and height;
   c. placing the objects in the layers;
   d. displaying the layers in a spaced apart layered view such that an axonometric view of the 2D image is generated, the axonometric view provides access to overlapped area of the selected object at an original position of the selected object within the 2D image, wherein the spaced a part layered view is a plurality of axonometric views;
   e. for each displayed layer providing:
      i. a visual cue to indicate when a cursor is placed within the displayed layer and the position of the cursor within the displayed layer, wherein the visual cue indicating when a cursor is placed within the displayed layer comprises shaking the displayed layer;
      ii. a visibility icon, which, when activated, renders the displayed layer transparent and the object in the layer hidden; and
      iii. a border surrounding each displayed layer; and
   f. for each object in each layer, providing controls for adjusting an X position and a Y position of the object within the layer;
   g. providing a control to adjust a space between the layers; and
   h. providing a control to adjust a depth of a selected layer, wherein a Z position of a selected layer is exchanged with a Z position of another layer when a user selects the selected layer.

2. The method of claim 1 including providing a visual cue to indicate a selected layer.

3. The method of claim 1, also comprising providing controls on the layers to set the visibility of the layers.

4. The method of claim 1, also comprising enabling an object in a selected layer to be repositioned within the layer.

5. A computer-readable medium, including computer-executable instructions that, when executed, cause a computing device to provide axonometric views of layers containing objects while preserving the visual attributes of the objects by:
   a. determining from a 2D image comprising a plurality of objects wherein at least an object overlaps a selected object, the objects to be included in an object group by (i) determining the selected object lined on user input; and (ii) determining only objects that overlap the selected object;
   b. determining dimensions of layers that encompass the objects by determining a union of the bounding rectangles of the objects, wherein each layer has substantially a same width and height;
   c. placing objects in the layers;
   d. providing a control for adjusting the space between the layers;
   e. providing a control for adjusting a depth of a selected layer, wherein a Z position of a selected layer is exchanged with a Z position of another layer when a user selects the selected layer;
   f. displaying the objects and the layers including the objects in an axonometric manner such that access is provided to the overlapped selected object while maintaining the overlapped selected object in position as depicted in the 2D image;
   g. for each displayed layer, providing:
      (i) a visual cue to indicate when a cursor is placed within the displayed layer and the position of the cursor within the displayed layer, wherein the visual cue indicating when a cursor is placed within the displayed layer comprises shaking the displayed layer, and
      (ii) a visibility icon, which, when activated, renders the displayed layer transparent and the object in the layer hidden; and
      (iii) a border surrounding each displayed layer; and
   h. for each object in each layer, providing controls for adjusting an X position and a Y position of the object within the layer.

6. The computer-readable medium of claim 5, wherein the visual attributes are chosen from the group comprising shape, color, size, and position.

7. The computer-readable medium of claim 5, including providing a visual cue that indicates the selected layer.

8. The computer-readable medium of claim 5, wherein the control for adjusting the space between the layers is a dragging action that occurs after a view has been selected.

9. The computer-readable medium of claim 5, wherein the control for adjusting the depth of the selected layers is clicking and dragging the layers.

10. The computer-readable medium of claim 5, also comprising providing controls that control the visibility of the layers.

11. The computer-readable medium of claim 5, also comprising enabling an object in a selected layer to be repositioned within the layer.

12. The computer-readable medium of claim 5, also comprising changing the dimensions of the layers as objects in the layers are repositioned.

13. A system for generating axonometric views, comprising at least a processor executing the following components:
   an input component that receives a 2D image comprising a plurality of objects comprised within a single layer;
   an analysis component that determines from the 2D image the objects to be included in an object group by determining at least one object in the 2D image that overlaps a selected object;
   a display component that facilitates placing objects included in the object group in respective layers such that each displayed layer comprises a visual cue to indicate when a cursor is placed within the displayed layer and the position of the cursor within the displayed layer, wherein the visual cue to indicate when a cursor is placed within the displayed layer comprises shaking the displayed layer, a visibility icon, which, when activated, renders the displayed layer transparent and the object in the layer hidden and the layers including the objects are displayed in an axonometric manner such that access is provided to the overlapped selected object while maintaining the overlapped selected object in position as depicted in the 2D image; and the display component further provides:

a plurality of position controls for adjusting an X position and a Y position of the objects within the layers such that the position controls provide in-place access to occluded area of the selected object included in a layer;

a control for adjusting the space between the layers, a control for adjusting the depth of a selected layer, wherein a Z position of a selected layer is exchanged with a Z position of another layer when a user selects the selected layer, wherein dimensions of layers that encompass the objects are determined by union of the bounding rectangles of the objects.

14. The system of claim 13, wherein the controls for adjusting the X and Y positions of the object within the layer are of a shape similar to the object in the layer.

* * * * *